(12) United States Patent
Banister

(10) Patent No.: US 10,990,586 B2
(45) Date of Patent: *Apr. 27, 2021

(54) SYSTEM AND METHOD FOR REVISING RECORD KEYS TO COORDINATE RECORD KEY CHANGES WITHIN AT LEAST TWO DATABASES

(71) Applicant: Richard Banister, Vista, CA (US)

(72) Inventor: Richard Banister, Vista, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/031,680

(22) Filed: Sep. 24, 2020

(65) Prior Publication Data

US 2021/0056097 A1 Feb. 25, 2021

Related U.S. Application Data

(63) Continuation-in-part of application No. 14/855,552, filed on Sep. 16, 2015, now Pat. No. 10,838,827.

(51) Int. Cl.
*G06F 16/23* (2019.01)
*G06F 16/21* (2019.01)
*G06F 16/28* (2019.01)
*G06F 16/27* (2019.01)

(52) U.S. Cl.
CPC ........ *G06F 16/2386* (2019.01); *G06F 16/213* (2019.01); *G06F 16/214* (2019.01); *G06F 16/273* (2019.01); *G06F 16/288* (2019.01)

(58) Field of Classification Search
CPC .. G06F 16/2386; G06F 16/273; G06F 16/214; G06F 16/288; G06F 16/213

USPC ....................................................... 707/639
See application file for complete search history.

(56) References Cited

U.S. PATENT DOCUMENTS

| | | | |
|---|---|---|---|
| 5,455,945 A * | 10/1995 | VanderDrift | .......... G06F 16/248 |
| 5,721,918 A | 2/1998 | Nilsson | |
| 5,806,067 A | 9/1998 | Connor | |
| 5,909,678 A | 6/1999 | Bergman | |
| 6,073,131 A | 6/2000 | Roberti | |
| 6,161,111 A | 12/2000 | Mutalik | |
| 6,208,990 B1 | 3/2001 | Suresh et al. | |
| 6,324,581 B1 | 11/2001 | Xu | |
| 6,564,215 B1 | 5/2003 | Hsiao | |
| 6,850,947 B1 | 2/2005 | Chung et al. | |
| 7,293,027 B2 | 11/2007 | Margolus | |

(Continued)

*Primary Examiner* — Dung K Chau
(74) *Attorney, Agent, or Firm* — Patrick Reilly

(57) ABSTRACT

A system and method to coordinate the changing of identifiers, i.e., primary keys and foreign keys, of new records generated by a first system by revision of these new records with alternate primary keys and foreign keys as generated and/or established by a second database system. The invention is an improvement over prior art transactional methods that maintain relationships among records when updating records of a first data base with replacement of primary and foreign keys provided by another database management system, and an improvement over prior art approaches to non-indexed schemas. Thus, the new method teaches how to batch update relationship fields in the first database with fewer database updates. The invention provides large savings for columnar databases, which are generally not indexed, and speeds up record key maintenance and harmonizing across two or more row-oriented databases.

16 Claims, 17 Drawing Sheets

(56) References Cited

U.S. PATENT DOCUMENTS

| | | |
|---|---|---|
| 7,330,997 B1 | 2/2008 | Odom |
| 7,467,267 B1 | 12/2008 | Mayock |
| 7,774,315 B1 | 8/2010 | Galker |
| 7,822,717 B2 | 10/2010 | Kapoor |
| 7,917,512 B2 | 3/2011 | Bhide |
| 7,941,408 B2 | 5/2011 | Sinha |
| 7,953,710 B2 | 5/2011 | Novik |
| 8,099,392 B2 | 1/2012 | Paterson |
| 8,117,165 B1 | 2/2012 | Winckelmann |
| 8,122,040 B2 | 2/2012 | Banister et al. |
| 8,296,221 B1 * | 10/2012 | Waelbroeck ............ G06Q 40/04 705/37 |
| 8,301,652 B2 | 10/2012 | Zhou |
| 8,311,988 B2 | 11/2012 | Cisler |
| 8,352,490 B2 | 1/2013 | Hansen |
| 8,375,010 B2 | 2/2013 | Banister et al. |
| 8,442,951 B1 | 5/2013 | Brannon |
| 8,495,041 B2 | 7/2013 | Enoki |
| 8,548,945 B2 | 10/2013 | Dwyer et al. |
| 8,666,944 B2 | 4/2014 | Beatty |
| 8,745,029 B2 | 6/2014 | Banister et al. |
| 8,812,482 B1 * | 8/2014 | Kapoor ................ G06F 16/273 707/713 |
| 8,954,401 B2 | 2/2015 | Zhang et al. |
| 9,454,587 B2 | 9/2016 | Lyons |
| 9,754,001 B2 | 9/2017 | Banister et al. |
| 10,025,673 B1 | 7/2018 | Maccanti |
| 2002/0004883 A1 | 1/2002 | Nguyen |
| 2002/0059299 A1 | 5/2002 | Spaey |
| 2002/0078218 A1 | 6/2002 | Feig |
| 2002/0095413 A1 | 7/2002 | Meding |
| 2002/0138376 A1 | 9/2002 | Hinkle |
| 2002/0161784 A1 | 10/2002 | Tarenskeen |
| 2003/0120625 A1 | 6/2003 | Jackson |
| 2004/0078228 A1 | 4/2004 | FitzGerald |
| 2004/0236796 A1 | 11/2004 | Bhatt |
| 2005/0055518 A1 | 3/2005 | Hochberg |
| 2005/0055519 A1 | 3/2005 | Stuart |
| 2005/0120062 A1 | 6/2005 | Sinha |
| 2006/0020616 A1 | 1/2006 | Hardy |
| 2006/0085608 A1 | 4/2006 | Saika |
| 2006/0179155 A1 | 8/2006 | Bunting |
| 2006/0190947 A1 | 8/2006 | Ghosh |
| 2007/0028056 A1 | 2/2007 | Harris |
| 2007/0100913 A1 | 5/2007 | Sumner |
| 2007/0106666 A1 | 5/2007 | Beckerle |
| 2007/0106845 A1 | 5/2007 | Chu |
| 2007/0136381 A1 | 6/2007 | Cannon |
| 2007/0183224 A1 | 8/2007 | Erofeev |
| 2007/0185937 A1 | 8/2007 | Prahlad |
| 2007/0186068 A1 | 8/2007 | Agrawal |
| 2008/0021926 A1 * | 1/2008 | Brock .................... G06F 16/40 |
| 2008/0034011 A1 | 2/2008 | Cisler |
| 2008/0184232 A1 | 7/2008 | Clark |
| 2008/0263007 A1 | 10/2008 | Schmidt |
| 2008/0307345 A1 | 12/2008 | Hart |
| 2008/0307347 A1 | 12/2008 | Gisler |
| 2009/0031006 A1 * | 1/2009 | Johnson .................. H04W 4/14 709/218 |
| 2009/0077075 A1 | 3/2009 | Bent |
| 2009/0150336 A1 | 6/2009 | Basu |
| 2009/0210429 A1 | 8/2009 | Agrawal |
| 2009/0249005 A1 | 10/2009 | Bender |
| 2009/0287746 A1 | 11/2009 | Brown |
| 2010/0082553 A1 | 4/2010 | Beatty |
| 2010/0318495 A1 | 12/2010 | Yan |
| 2011/0082890 A1 * | 4/2011 | Banister ................ G06F 16/972 707/792 |
| 2011/0167148 A1 | 7/2011 | Bodziony |
| 2011/0282890 A1 * | 11/2011 | Griffith ................ G06F 16/285 707/758 |
| 2011/0320400 A1 * | 12/2011 | Namini .................... G06F 16/21 707/610 |
| 2012/0124081 A1 | 5/2012 | Ebrahimi |
| 2012/0221522 A1 | 8/2012 | Allman et al. |
| 2012/0254137 A1 | 10/2012 | Rozenwald |
| 2012/0323924 A1 | 12/2012 | Okun |
| 2013/0036089 A1 | 2/2013 | Lucas |
| 2013/0042083 A1 | 2/2013 | Mutalik |
| 2013/0191523 A1 | 7/2013 | Buck |
| 2013/0212599 A1 | 8/2013 | Giampaolo |
| 2013/0232331 A1 | 9/2013 | Farhan |
| 2013/0238552 A1 | 9/2013 | Salb |
| 2013/0275379 A1 | 10/2013 | Trebas |
| 2013/0339379 A1 | 12/2013 | Ferrari |
| 2013/0346365 A1 | 12/2013 | Kan |
| 2014/0006357 A1 | 1/2014 | Davis |
| 2014/0007239 A1 | 1/2014 | Sharpe |
| 2014/0074790 A1 | 3/2014 | Berman |
| 2014/0229506 A1 | 8/2014 | Lee |
| 2015/0066865 A1 | 3/2015 | Yara |
| 2015/0205850 A1 | 7/2015 | Lu |
| 2015/0269215 A1 * | 9/2015 | Lehouillier ......... G06F 16/2358 707/626 |
| 2015/0331755 A1 | 11/2015 | Morgan |
| 2015/0378865 A1 | 12/2015 | Robertson |
| 2016/0352815 A1 | 12/2016 | Mozolewski |

\* cited by examiner

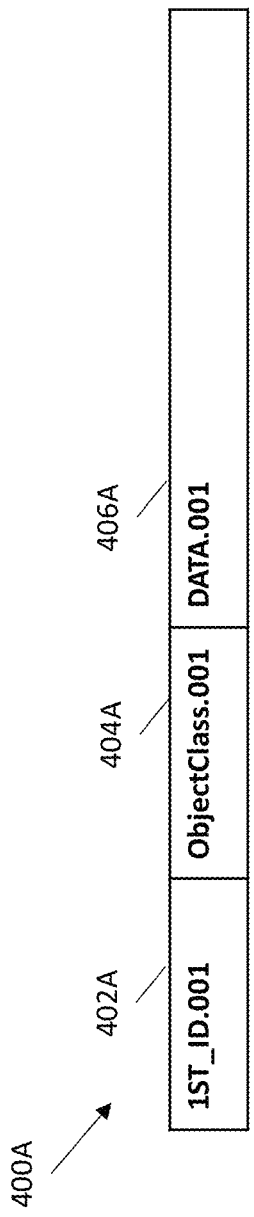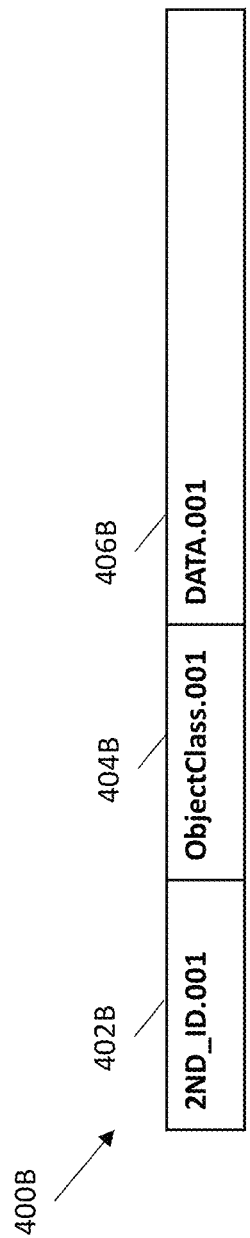

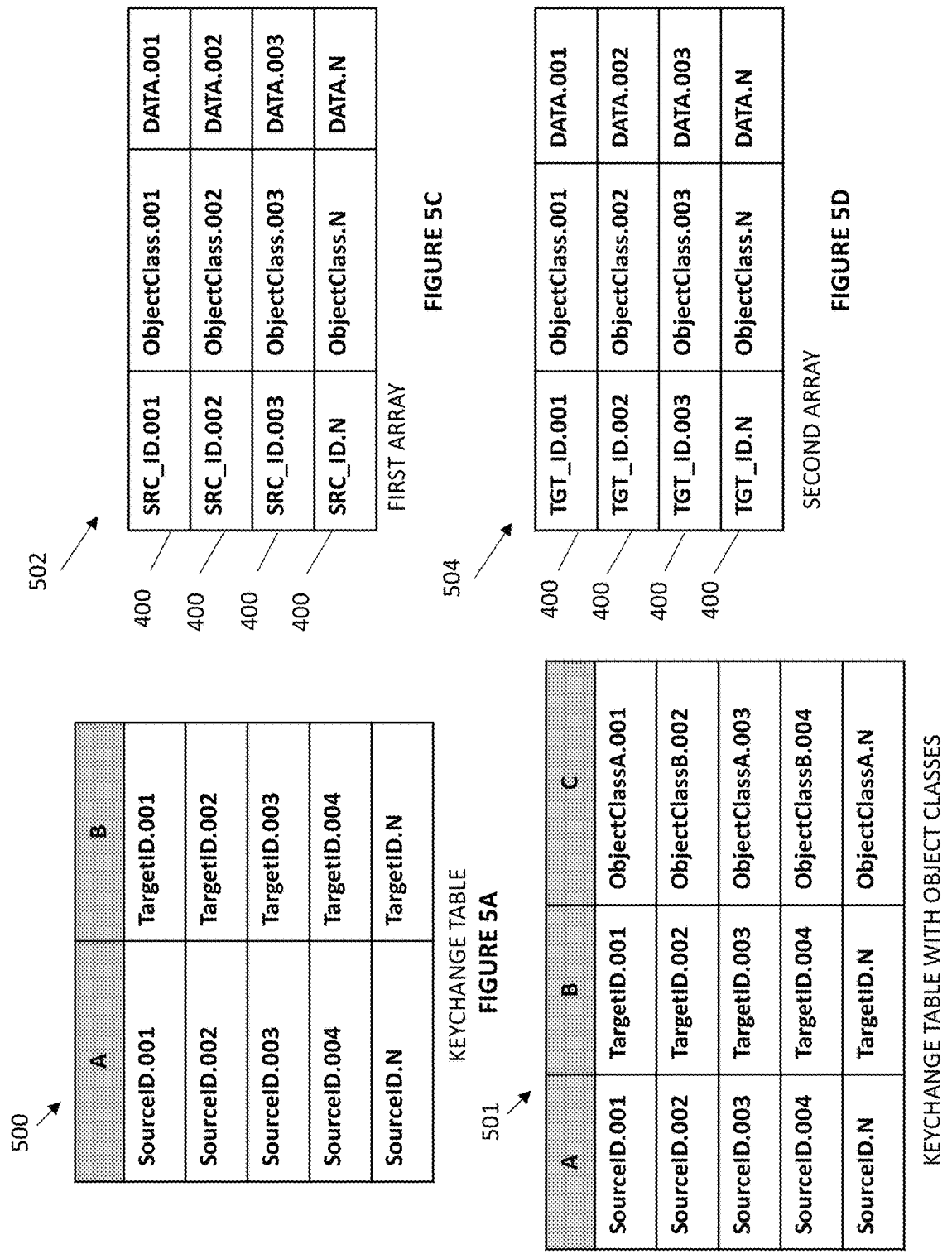

501A

| A | B | C |
|---|---|---|
| SourceID.001 | TargetID.001 | ObjectClassA.001 |
| SourceID.003 | TargetID.003 | ObjectClassA.003 |
| SourceID.N | TargetID.N | ObjectClassA.N |

SPLIT KEYCHANGE TABLE WITH OBJECT CLASSES (PART 1)

| A | B | C |
|---|---|---|
| SourceID.002 | TargetID.002 | ObjectClassB.002 |
| SourceID.004 | TargetID.004 | ObjectClassB.004 |

SPLIT KEYCHANGE TABLE WITH OBJECT CLASSES (PART 2)

FIGURE 5F

NEW PARENT RECORD REC.01

| TargetParentID.01 | | | |
|---|---|---|---|
| | | | |

NEW CHILD1 RECORD REC.02

| SourceChild1ID.02 | | SourceParentID.01 | |
|---|---|---|---|
| | | | |

NEW CHILD2 RECORD REC.03

| SourceChild2ID.03 | | SourceParentID.01 | |
|---|---|---|---|
| | | | |

FIGURE 7

NEW PARENT RECORD REC.01

| TargetParentID.01 | |
|---|---|

NEW CHILD1 RECORD REC.02

| SourceChild1ID.02 | TargetParentID.01 |
|---|---|

NEW CHILD2 RECORD REC.03

| SourceChild2ID.03 | TargetParentID.01 |
|---|---|

FIGURE 8

NEW PARENT RECORD REC.001

| TargetParentID.01 | | | |
|---|---|---|---|

NEW CHILD1 RECORD REC.02

| TargetChild1ID.02 | | TargetParentID.01 | |
|---|---|---|---|

NEW CHILD2 RECORD REC.03

| TargetChild2ID.03 | | TargetParentID.01 | |
|---|---|---|---|

SYSTEM AND METHOD FOR REVISING RECORD KEYS TO COORDINATE RECORD KEY CHANGES WITHIN AT LEAST TWO DATABASES

CO-PENDING APPLICATION

This Nonprovisional Patent Application is a Continuation-in-Part Patent Application to Nonprovisional patent application Ser. No. 14/855,552 as filed on Sep. 16, 2015 by Inventor Richard Banister. Nonprovisional Patent Application Ser. No. 14/855,552 is hereby incorporated into its entirety and for all purposes into the present disclosure.

FIELD OF THE INVENTION

The present invention relates to a process for the maintenance and updating of digitized records. More particularly, the present invention relates to a system for generating a provisional identifier for a new record added to a first database, at least partially transferring information from the new record to a second database, and later changing the provisional identifier to a primary key assigned by a second database management system.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Databases are ubiquitous and crucial in consumer, business, and government operations. One common organizational structure often used entails having a central 'system of record' database available over a network and containing all of the stored records that are kept within that particular database, and for this database to be accessed by multiple terminals such as computers connected to the same network. One example of this might be a customer database for a business, wherein employees working at a local branch office update customer information or add new customers, then load their new information to be added to the master copy. Another example might be a business that provides a remote database service, such as Salesforce.

Many databases rely on primary keys, such as but not limited to serialized ID numbers or a Globally Unique Identifier (GUID), to organize their large sets of records. When one has multiple branch terminals adding new records to a central database, as described above, it is generally imperative that the branch terminals not originate their own primary keys, but let the central database assign these instead, in order to prevent duplicates. For at least this reason, branch office terminals operating within this model are generally kept connected to the central database system at all times, despite the additional resources burned by being 'always on', with organizational difficulties discouraging adoption of any more incremental timetable for updating or loading of records. Additionally, if a branch office experiences an internet problem and is disconnected from the network, they may be simply unable to enter any new records into the system until the problem is fixed, lacking an adequate solution for mediating between any local-only creation of records and creation of 'real' records in the central database.

There is therefore a long-felt need to provide a method and system that optimally handle organization and consistent inclusion of new records originated independently of the central database.

SUMMARY OF THE INVENTION

Towards these and other objects of the method of the present invention (hereinafter, "the invented method") that are made obvious to one of ordinary skill in the art in light of the present disclosure, what is provided is a system and method for (1.) assigning a temporary or provisional unique identifier to a new record originated by a first database management system, (2.) loading information from the new record to a second database management system, (3.) receiving a unique identifier assigned to the new record by the second database management system, (4.) associating the assigned unique identifier with the temporary unique identifier, and (5.) updating the first database copy of the same new record to include the unique identifier assigned by the second database management system.

The method of present invention provides a system and method to coordinate record key changes within at least two databases. In various alternate preferred embodiments of the invented method, the first database, the first database management system, the second database, and/or the second database management system may be hosted on a same information technology system and/or separate and distinct information technology systems.

The invented method may also be used to add and update multiple records in a same batch, rather than just one at a time, in a process that may optionally include information related to a hierarchy structure of parent and child records. A 'parent and child' hierarchy of organizing records is understood herein to mean a system of organizing records wherein one or more records, i.e. child records, are considered to be linked to, contained within, subordinate to, under the heading of, and/or under the scope of a parent record. As an example of an organizational hierarchy that might be structured this way in a database, one might consider a medical database that contains records concerning one or more patients, and attached to each of those patient records (in addition to the patient's name, date of birth, insurance information, and so forth) might be a list of that same patient's previous office visits or medical procedures, each of these its own record containing information about that specific visit or procedure (such as the date, the reason for the visit or procedure, and what was done, recommended, or prescribed). In this way, one 'parent' patient record may be linked or related to several 'child' visit records.

One decisive improvement over the prior art represented in several alternate preferred embodiments of the invention, particularly the embodiments using keychange tables, is an improved approach to prior art non-indexed schemas, i.e., prior art cases wherein database records are formatted such that the database records are not indexed and not listed in a single consistent order. Performance on non-indexed schemas requires a different approach, which is done in certain alternate preferred embodiments of the invented method by bulk updates of the primary and foreign key fields in a set of records that have been transferred, instead of by prior art record-level updating. In certain other alternate preferred embodiments of the invented method record updates are kept organized by updating records in batches or groups, rather than by a prior art-by-tier or index-by-index scan through the database.

It is understood that no example offered in the present disclosure is offered as a limitation of the invented method, but is presented as a clarifying example of one or more essential or optional aspects of the invented method.

Further, it is understood that the scope of meaning of the term "load" as expressed in this disclosure includes uploading information, downloading information, and/or any transfer of data (a.) to or from one database to another database or database management system, or (b.) to or from an information technology system or network node to a computer system or other computational device.

In several preferred embodiments of the invented method, information extracted from a set of new records generated by the first database management system is loaded to the second database management system in the form of an ordered array, such that when the ordered array is returned in a same order that had been provided to the second database management system, with second unique identifiers properly assigned by the second database management system, whereby the temporary first keys can be associated with their corresponding assigned second unique identifiers by array order, as provided by the second database management system in the ordered array pattern as loaded from the first database management system. In certain alternate preferred embodiments of the invented method, the order of the array is preserved throughout the transaction, as this allows the 'temporary' keys generated by the first database management system to be matched correctly to 'official' keys generated by the second database management system.

Preferred embodiments of the invention include splitting the records to be at least partially loaded into two or more separate arrays, such that the parent records are at least partially loaded separately, and thereafter the child records are at least partially loaded afterward. In certain of these alternate preferred embodiments of the invented method, an approximation of the same basic steps may ensue: (1.) an array of information extracted from parent records is at least partially loaded by the first database management system, (2.) a matching array listing the same set of records with second unique record identifiers assigned is returned by the second database management system to the first database management system, (3.) the parent records of the first database are updated with second identifiers assigned by the second database management system to the corresponding records as instantiated in the second database, (4.) the linking data fields of the child records are updated accordingly with the linking identifiers associated with their parent records, (5.) an additional array containing information extracted from the set of child records is at least partially loaded to the second database management system, already having all of the record data complete (particularly including the linking second identifiers) except for their own primary identifiers, and (6.) the array is returned for the child records and the first database child records are updated with their assigned primary identifiers. When temporary identifiers are used in accordance with the invented method, separate loads of parent and child records are strongly encouraged, for at least the reason that the child records aren't complete until they have the non-temporary identifier by which to refer to their parent.

One skilled in the art will naturally recognize that any approach to enacting the invented method upon multiple records instead of just a single record is a variation on expanding the same basic procedure for enacting the invented method upon just one record, that many approaches to doing this are possible as encompassed by the present invention, and that some approaches may be preferable to others. Which of these is best may depend on the content or structure of the records or database in question. Herein are described a few methods for updating multiple records that are considered more generally effective in view of the invented method, but these examples do not constitute a comprehensive listing of all possible approaches to updating multiple records using the invented method.

Regarding unique identifiers, it should be noted that there is more than one way to uniquely identify a database record. Besides unique numbering, other data fields might be just as unique and render adding of index numbers redundant; the records might be identified by such other unique field. Additionally, two or more data fields could be viewed in conjunction as a unique identifier, just as someone might identify a person by the combination of their given name and surname ("Bob Smith" identifies more specifically than just "Bob", and could be necessary in a group that contains two Bob's or two Smith's), or identify a book by the combination of both title and author. Use of the terms 'primary key', 'unique identifier', or 'record identifier' herein should be interpreted broadly to mean any of these, or any suitable means of reliably identifying exactly one database record.

In some preferred embodiments, the records may include a flag to set for indicating that an associated record's identifier is temporary or unofficial (for example, generated by the first database management system), and awaiting assignment of an updated identifier, such as one assigned by the second database management system. Setting and unsetting flags, a practice commonly known in the art, may be enacted by inclusion in the record of a Boolean variable, a meaningful code, or any other means known in the art. Additionally and alternatively, the system might keep track of which records have no second record identifiers (yet) by other means, such as with a formatting convention for the identifiers themselves or a log kept by the system. It is understood that keeping track of records' having a first-system-generated identifier but no second-system-generated identifier is not required in all preferred embodiments of invented method.

In certain additional preferred embodiments of the invented method, one or more records include an object class indication and/or metadata that assists the database updating transaction by indicating where in the record an associated identifier is located, which data field(s) contain associated identifier(s), or how to access an associated identifier. For instance, in an example offered not as a limitation of the invented method but for clarity in illustration of the invented method, stored data regarding the format in which a record is organized takes the form of an object-oriented class definition, an encoded string or number sequence, or other suitable forms known in the art. This information can be useful in updating the database at least because the updating system might easily look up how different data fields are accessed or where these are located in any record or class of records, allowing for efficient updating of and compatibility with any variety of records. Metadata is optionally used in certain yet additional preferred embodiments of the invented method, wherein encoding useful information is provided.

Certain even other preferred embodiments of the invented method are strictly one-sided, handling the first side of the operation such that the second system or system of record database being interacted with need not even be aware that there are temporary keys being assigned or subsequently replaced.

The scope of the term "keychange table" as expressed in this disclosure is understood to mean a data structure for associating two record identifiers. This may be or comprise a table, but might also be or comprise a map, a matrix, a two-dimensional array, or any suitable means as known in the art or discovered in the future for organizing and associating data.

It should be noted that the terms used herein for the two systems hosting databases are "first" and "second". Any usage of these common terms "first" and "second" that is not naming a system or server-related object has been re-phrased specifically to not use the terms "first" and "second", or to qualify actual ordinal usages as "ordinally first" or "ordinally second". Any un-qualified usage of "first" or "second" in this context should be read as pertaining to the first and second systems or servers. For instance, a "first record" and "first identifier" are not ordinally first in a list or sequence, but rather a record and identifier that pertain or belong to the first system.

Additionally, the term "system" is used herein regarding computer platforms, systems, and servers, and should be understood as interchangeable and synonymous with statements regarding servers or other devices, portions of devices, or networks of devices capable of performing the function of a server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The detailed description of some embodiments of the invention is made below with reference to the accompanying figures, wherein like numerals represent corresponding parts of the figures.

FIG. 4A is a block diagram of an example first database record that may be stored in the first database of FIG. 1;

FIG. 4B is a block diagram of an example second record that may be stored in the second database of FIG. 1;

FIG. 5A is a block diagram representing an example of the keychange table that may be used in some embodiments of the invented method;

FIG. 5B is a block diagram representing an alternate example of the keychange table of FIG. 5A that may be used in some embodiments of the invented method;

FIG. 5C is a block diagram representing an example of the first system array that may be used in some embodiments of the invented method;

FIG. 5D is a block diagram representing an example of the second system array that may be used in some embodiments of the invented method;

FIG. 5E is a block diagram representing a first half of an example wherein the keychange table of FIG. 5B has been split up by object class;

FIG. 5F is a block diagram representing a second half of an example wherein the keychange table of FIG. 5B has been split up by object class;

FIG. 7 is a block diagram of the parent and child records of FIG. 6, at a later point in the updating process;

FIG. 8 is a block diagram of the parent and child records of FIG. 7, at a later point in the updating process;

FIG. 9 is a block diagram of the parent and child records of FIG. 8, at a later point in the updating process;

DETAILED DESCRIPTION OF DRAWINGS

Figure 1:
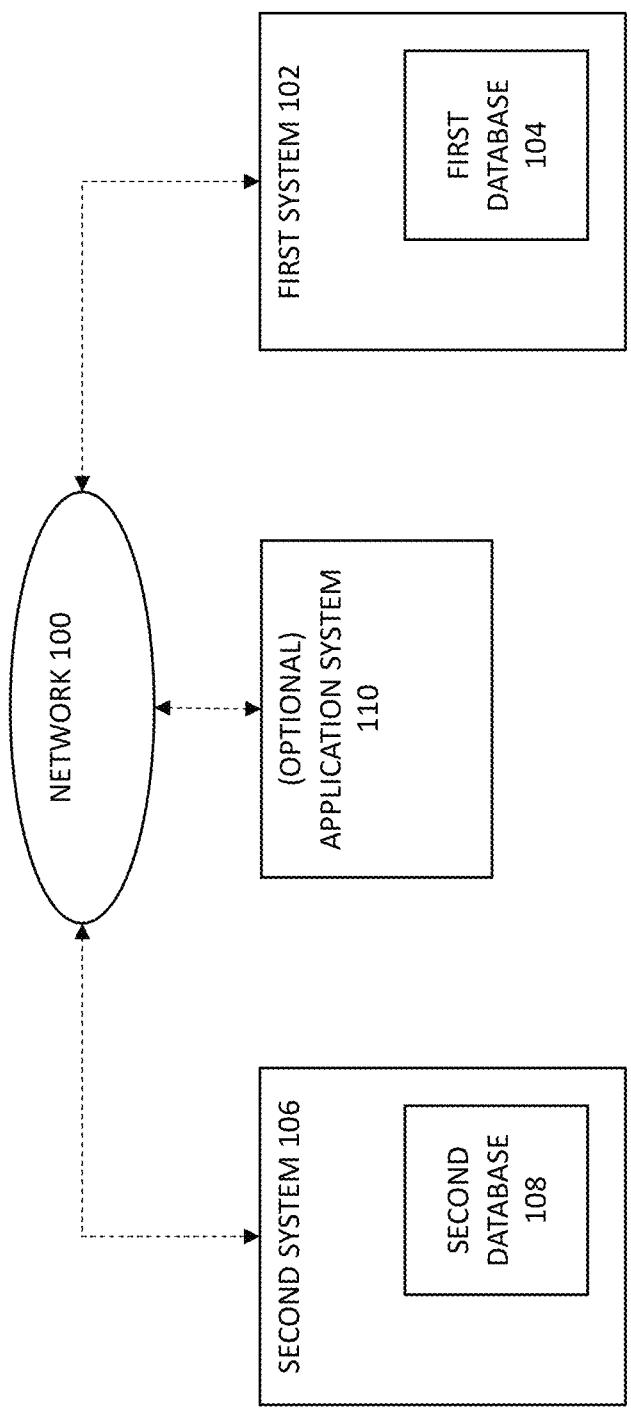
FIG. 1 is a block diagram of an electronic communications network in which the invented method might be practiced.

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits' ranges, excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" can include multiple processors. In some cases, a process that may be performed by "a processor" may be actually performed by multiple processors on the same device or on different devices. For the purposes of this specification and claims, any reference to "a processor" shall include one or more processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, one or more magnetic disks, solid state memory, flash memory, file storage and/or block storage, and/or a cloud platform as a service, i.e., "PaaS", or any other medium known in the art which can be used to store the desired information and which can be accessed by an instruction execution system.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Additionally, it should be understood that any transaction or interaction described as occurring between multiple computers is not limited to multiple distinct hardware platforms, and could all be happening on the same computer. It is understood in the art that a single hardware platform may host multiple distinct and separate system or client functions.

Throughout this specification, like reference numbers signify the same elements throughout the description of the figures.

Referring now generally to the Figures, and particularly to FIG. 1, FIG. 1 is a diagram of an electronic communications network 100 (hereinafter "the network"), comprising a source system 102 (hereinafter, "first system" 102) that hosts a first database 104, a target system 106 (hereinafter, "the second system" 106) that hosts a second database 108, and, optionally, an application system 110 that may assist or perform software functions pertaining to the invented method, all bidirectionally communicatively coupled by means of this network 100.

It is understood that the term "system" is being used herein as referring collectively to the hardware and software of a computer that together enable and direct this computer to make available or provide a certain service, and is being used as synonymous with the term server. In the present instance, the relevant service being provided by the first system 102 is access to the first database 104 via enabling software installed on the system and via the system's physical interfaces which may include a network cable, wireless network connection, or a display monitor and keyboard/mouse.

Figure 2:
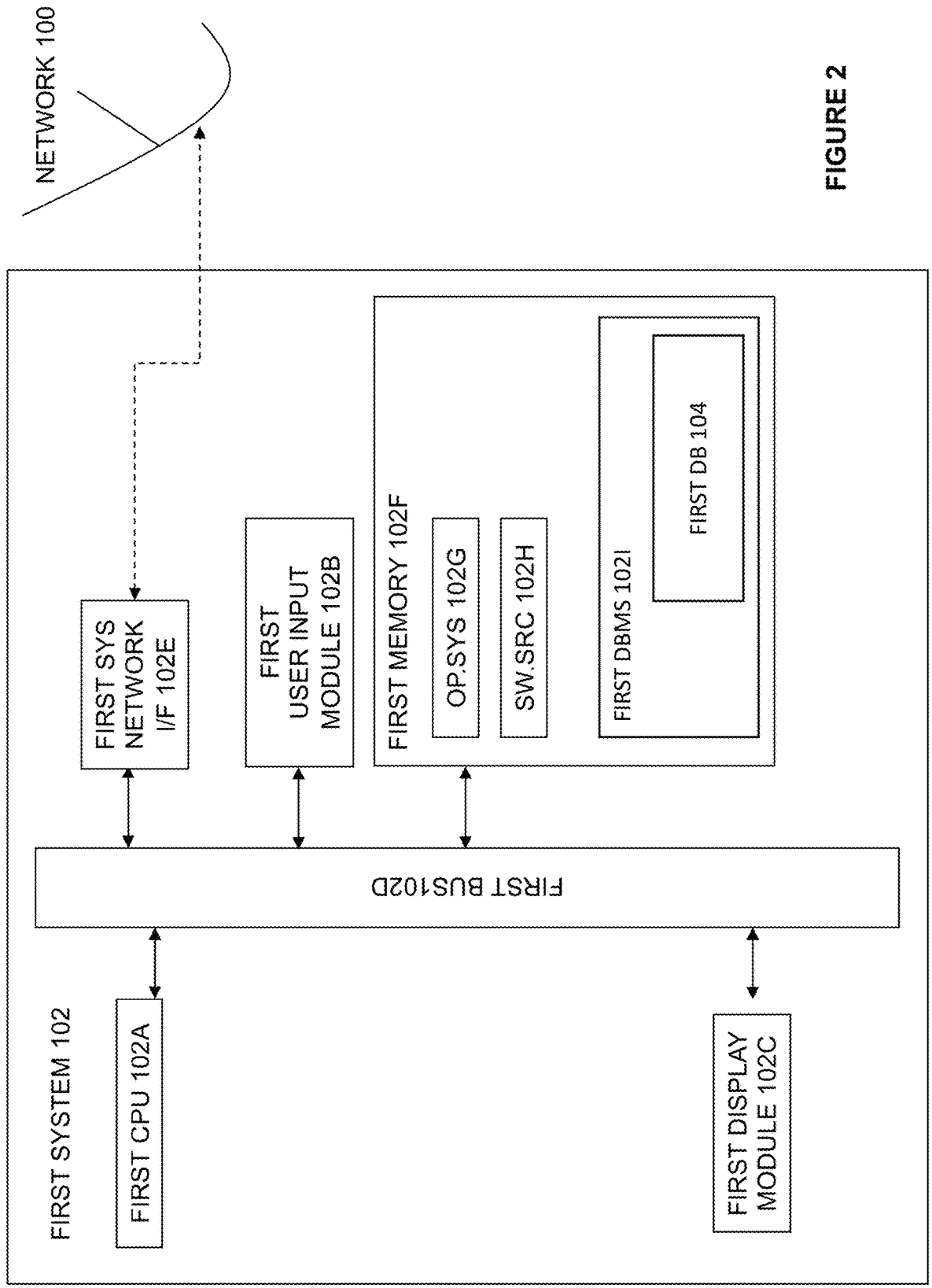
FIG. 2 is a block diagram of the first system of FIG. 1.

Therefore, the first system 102 as presented in FIG. 1 and FIG. 2 and referenced throughout is understood to represent both a physical computer connected to the network 100 by physical means such as a cable or wireless mechanism, and also the software hosted by this same computer that enables bidirectional data transmission and reception by means of the network 100 in addition to software functions enabling this system's providing the service relevant to the present invention, namely access to the first database 104 and software functionality in accordance with the invented method.

Figure 3:
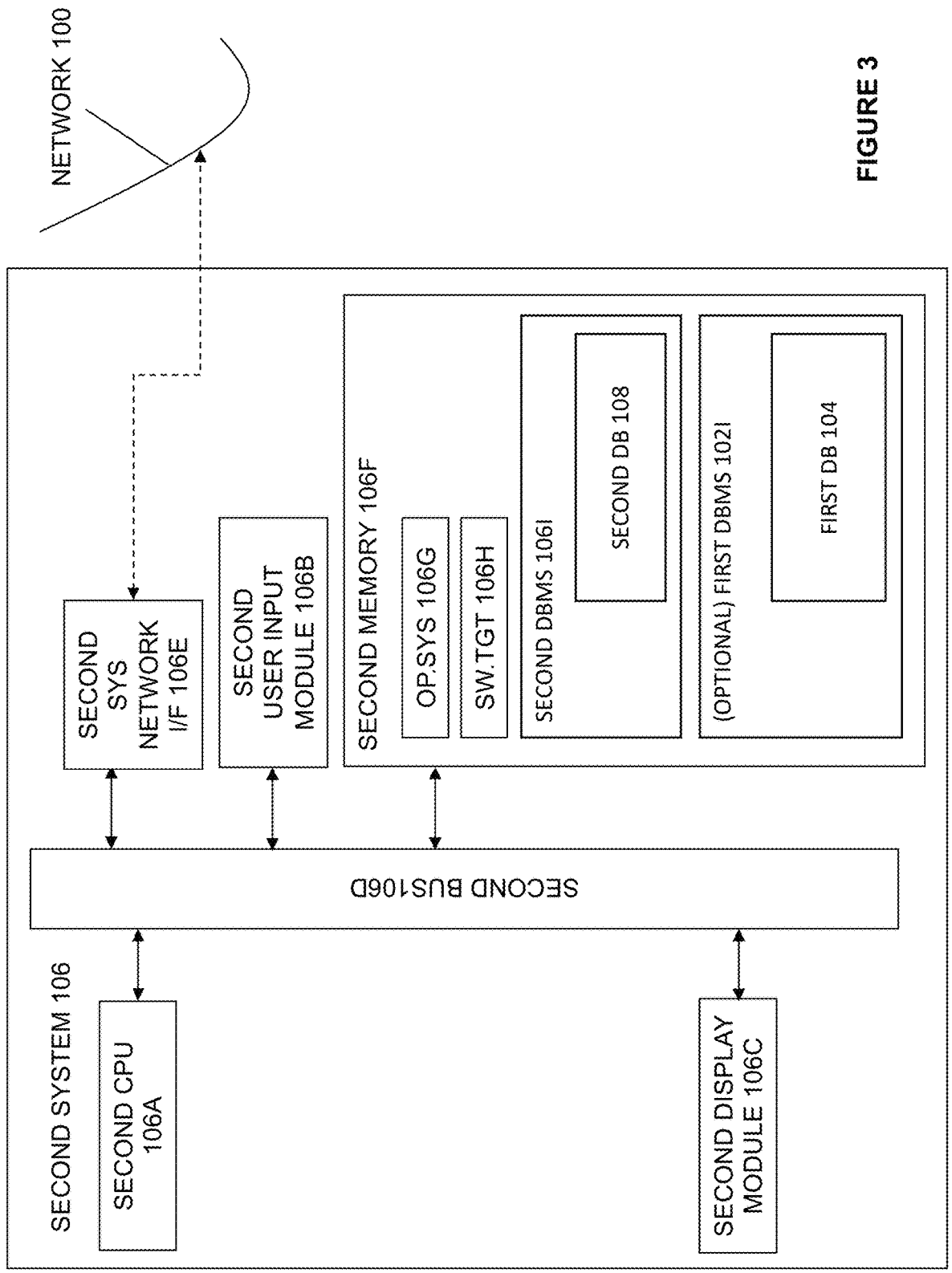
FIG. 3 is a block diagram of the second system of FIG. 1.

Additionally, the second system 106 as presented in FIG. 1 and FIG. 3 and referenced throughout is understood to represent both a physical computer connected to the network 100 by physical means such as a cable or wireless mechanism, and the software hosted by this same computer that enables bidirectional data transmission and reception by means of such the network 100, in addition to software functions enabling this system's providing the service relevant to the present invention, namely access to the second database 108 and software functionality in accordance with the invented method.

Additionally, the application system 110 as presented in FIG. 1 is understood to represent both a physical computer connected to the network 100 by physical means such as a cable or wireless mechanism, and the software hosted by this same computer that enables bidirectional data transmission and reception by means of such the network 100, in addition to software functions enabling this system's providing the service relevant to the present invention, namely operation of a software application that directs and enacts the invented method in coordination with the first system 102 and second system 106.

Referring now generally to the Figures, and particularly to FIG. 2, FIG. 2 is a block diagram of the first system 102 of the network 100 of FIG. 1 and displaying together both hardware and software aspects thereof, wherein the first system 102 comprises: a central processing unit ("CPU") 102A; a user input module 102B; a display module 102C; a software bus 102D bi-directionally communicatively coupled with the CPU 102A, the user input module 102B, the display module 102C; the software bus 102D is further bi-directionally coupled with a network interface 102E, enabling communication with alternate computing devices by means of the network 100; and a first memory 102F. The first software bus 102D facilitates communications between the above-mentioned components of the first system 102.

Alternatively, optionally and/or additionally the first system 102 and its functions as disclosed in the present disclosure are wholly or in part are comprised within, provided within, and/or made accessible via, or directly or indirectly via the network 100, including but not limited to a Virtual Machine and/or Platform as a Service, including but not limited to an Amazon Web Services (AWS) asset, a Microsoft Cloud (Azure) asset or service, a Google Cloud service or asset, and Oracle Cloud Infrastructure (OCI) asset or service, and/or one or more suitable internet-accessible assets or services in singularity, in concert or in combination.

The memory 102F of the first system 102 includes a first software operating system OP.SYS 102G. The first software OP.SYS 102G of the first system 102 may be selected from freely available, open source and/or commercially available operating system software, to include but not limited to IBM Power System 5924 marketed by IBM, or Dell EMC PowerEdge™ Servers; or (d.) other suitable computational system or electronic communications device known in the art capable of providing networking and operating system services as known in the art capable of providing networking and operating system services as known in the art. The exemplary first system software program SW. SRC 102H consisting of executable instructions and associated data structures is optionally adapted to enable the first system 102 to (a.) generate messages and communicate with the second system 106, (b.) process communicate with and process messages received from the second system 106, and (c.) manage a first database management system 102I ("first DBMS 102I") which is hosting and managing one or more first databases 104 to perform, execute and instantiate all elements, aspects and steps as required of the first system 102 to practice the invented method in its various preferred embodiments interaction with the second system 106.

Referring now generally to the Figures, and particularly to FIG. 3, FIG. 3 is a block diagram of the second system 106 of the network 100 of FIG. 1 and displaying together both hardware and software aspects thereof, wherein the second system 106 comprises: a central processing unit ("CPU") 106A; a user input module 106B; a display module 106C; a software bus 106D bi-directionally communicatively coupled with the CPU 106A, the user input module 106B, the display module 106C; the software bus 106D is further bi-directionally coupled with a network interface 106E, enabling communication with alternate computing devices by means of the network 100; and a second memory 106F. The second software bus 106D facilitates communications between the above-mentioned components of the second system 106.

Alternatively, optionally and/or additionally the second system 106 and its functions as disclosed in the present disclosure are wholly or in part are comprised within, provided within, and/or made accessible via, or directly or indirectly via the network 100, including but not limited to a Virtual Machine and/or Platform as a Service, including but not limited to an Amazon Web Services (AWS) asset, a Microsoft Cloud (Azure) asset or service, a Google Cloud service or asset, and Oracle Cloud Infrastructure (OCI) asset or service, and/or one or more suitable internet-accessible assets or services in singularity, in concert or in combination.

The memory 106F of the second system 106 includes a second software operating system OP.SYS 106G. The second software OP.SYS 106G of the second system 106 may be selected from freely available, open source and/or commercially available operating system software, to include but not limited to (a.) an HP Z620 AutoCAD Workstation E5-1620v2™ marketed by Hewlett Packard Enterprise of San Jose, Calif. and running a WINDOWS 10 PROFESSIONAL™ 64-Bit operating system as marketed by Microsoft Corporation of Redmond, Wash.; (b.) a Dell Precision Mobile Workstation 3551—15.6"—Core i5 10300H™ marketed by Dell Corporation of Round Rock, Tex.; (c.) a MAC PRO™ workstation as marketed by Apple, Inc. of Cupertino, Calif.; or (d.) other suitable computational system or electronic communications device known in the art capable of providing networking and operating system services as known in the art capable of providing networking and operating system services as known in the art. The exemplary second system software program SW. SRC 106H consisting of executable instructions and associated data structures is optionally adapted to enable the second system 106 to (a.) generate messages and communicate with the first system 102, (b.) communicate with and process messages received from the first system 102, and (c.) manage a second database management system 106I ("second DBMS 106I") which is hosting and managing one or more second databases 108 to perform, execute and instantiate all elements, aspects and steps as required of the second system 106 to practice the invented method in its various preferred embodiments interacting with the first system 102.

Presented additionally is the first DBMS 102I as possibly and potentially hosted on the same system as the second DBMS 106I, in some alternate preferred embodiments of the present invention. The present invention is not limited to interactions taking place between two entirely separate computers; it is understood in the art that a single platform may host multiple distinct and separate system functions.

Referring now generally to the Figures and particularly to FIGS. 4A & 4B, FIGS. 4A & 4B are block diagrams each representing a record 400 stored in a database, as discussed herein. FIG. 4A is a representation of a first record 400A, one or more of which may be stored in the first database 104, and FIG. 4B is a representation of a second record 400B, one or more of which may be stored in the second database 108. Each record 400 may include at least: (a.) a primary record identifier 402, labeled in FIGS. 4A & 4B respectively as a first record identifier 402A and a second record identifier 402B; (b.) an object class 404, labeled in FIGS. 4A & 4B respectively as a first object class 404A and a second object class 404B; and (c.) one or more additional data fields 406 containing other information, labeled respectively in FIGS. 4A & 4B as a first additional data field 406A and a second additional data field 406B. It should be understood that these diagrams present this single additional data field 406 as a stand-in for 'all of the other information contained in the record', which may or may not be relevant for updating the databases, except inasmuch as the data 406 gets modified or moved around by database updates. Additionally, it should be noted that in FIGS. 4A & 4B, the first record identifier 402A represents a record identifier 402 that was assigned by the first system 102, while the second record identifier 402B represents an 'official' record identifier 402 that was assigned by the second system 106. The first record 400A may, and at the end of the invented process ideally should, include the second record identifier 402B as its record identifier 402, rather than the first record identifier 402A generated for temporary identification in accordance with the invented method. However, one of each is presented here, so that these distinct identifier 402 elements may be named and numbered appropriately in discussion of the Figures. Additionally, it should be noted that there are other ways of representing or expressing the record information presented besides the separate data fields shown and labeled herein. For instance, one might use a numbering convention such as a prefix or suffix in the record identifiers 402 that additionally signifies what the object class of the record is; in this case, a separate data field signifying that would be redundant, as the record identifier 402 serves as both. One should consider any format known in the art for recording and presenting these pieces of information to be a valid instance of the record 400 that has the record identifier 402, the object class 404, and some other data 406.

Referring now generally to the Figures and particularly to FIG. 5A, FIG. 5A is a block diagram representing a keychange table 500 for associating first record identifiers 402A with corresponding second record identifiers 402B. In the diagram, column A as labeled contains a plurality of first record identifiers 402A, and column B as labeled contains a plurality of second record identifiers 402B, such that each row of the keychange table 500 contains a paired set of first record identifier 402A and second record identifier 402B that correspond to the same database record 400, such that the first record identifier 402A generated for temporary use by the first system 102 may be swapped out with the corresponding second record identifier 402B as assigned by the second system 106 when the same record was added into the second database 108.

Referring now generally to the Figures and particularly to FIG. 5B, FIG. 5B is a block diagram representing a keychange table with object classes 501, which is for associating first record identifiers 402A with corresponding second record identifiers 400B and also contains a data field for the records' object class 404, presented here as column C as labeled. The keychange table with object classes 501 should be considered an additional version or embodiment of the keychange table 500, with the additional feature of including object classes 404 to facilitate the updating process. In the diagram, column A as labeled contains a plurality of first record identifiers 402A, column B as labeled contains a plurality of second record identifiers 402B, such that each row of the keychange table 500 contains a paired set of first record identifier 402A and second record identifier 402B that correspond to the same database record 400, such that the first record identifier 402A generated for temporary use by the first system 102 may be swapped out with the corresponding second record identifier 402B as assigned by the second system 106 assigned when the same record was added into the second database. Column C contains the object class 404 associated with each record, to facilitate and support the updating process.

Referring now generally to the Figures and particularly to FIG. 5C, FIG. 5C is a block diagram representing a first array 502, such as might be sent from the first system 102 to the second system 106. This array contains at least one new record 400 for inclusion in the second database 108, and the records in the array have yet to be assigned second record identifiers 402B. The first array may include the first record identifiers 402A (as shown), or not; in most embodiments of the invented method, the second system 106 would simply ignore the first record identifier 402A as just more other data 406. This array 502 might contain the full database records 400, or might be an 'index' sent accompanying the data packet(s) containing all of the record data.

Referring now generally to the Figures and particularly to FIG. 5D, FIG. 5D is a second array 504, such as might be generated by the second system 106 in practicing the invented method. After the second system 106 incorporates the new records 400 received from the first system 102 into the second database 108, the second DBMS informs the first system which second record identifiers were assigned to the new records 400 that were sent. In practicing the invented method, this notification may take the form of the second array, which is sent back to the first system 102 from the second system 106 and contains this information. In many preferred embodiments of the invented method, the most essential aspect is that the first array 502 has the records 400 listed in a specific order, and that the second array 504 matches that same order, such that first record identifiers 402A and second record identifiers 402B can be matched up in the keychange table 500. While the second array 504 presented in FIG. 5D happens to be presented as containing all of the record data, databases containing large records 400 might find this impractical; a possible embodiment wherein the second array 504 is basically just an ordered list of identifiers 402B might easily be implemented.

Referring now generally to the Figures and particularly to FIGS. 5E & 5F, FIGS. 5E & 5F are the table of FIG. 5B, split into multiple separate tables 501A and 501B, distinguished by object class 404. In the diagram, column A as labeled in each keychange table 501A & 501B contains a plurality of first record identifiers 402A, column B as labeled contains a plurality of second record identifiers 402B, such that each row of the tables 501A & 501B contains a paired set of first record identifier 402A and second record identifier 402B that correspond to the same database record 400, such that the first record identifier 402A generated for temporary use by the first system 102 may be swapped out with the corresponding second record identifier 402B as assigned by the second system 106 assigned when the same record was added into the second database. Column C of each keychange table 501A & 501B contains the object class 404 associated with each record, to facilitate and support the updating process. To further explicate, the records 400 in the keychange table 501A are all of the object class "ObjectClassA", and the records 400 in the keychange table 501B are all of the object class "ObjectClassB", as indicated in Column C of the keychange tables 501A & 501B. One can see that if the contents of the keychange tables 501A & 501B of FIGS. 5E & 5F were (re-)combined, the result would be the keychange table 501 of FIG. 5B. Further discussion regarding splitting of tables is available in the text regarding FIG. 10A through 10C.

Figure 5G:
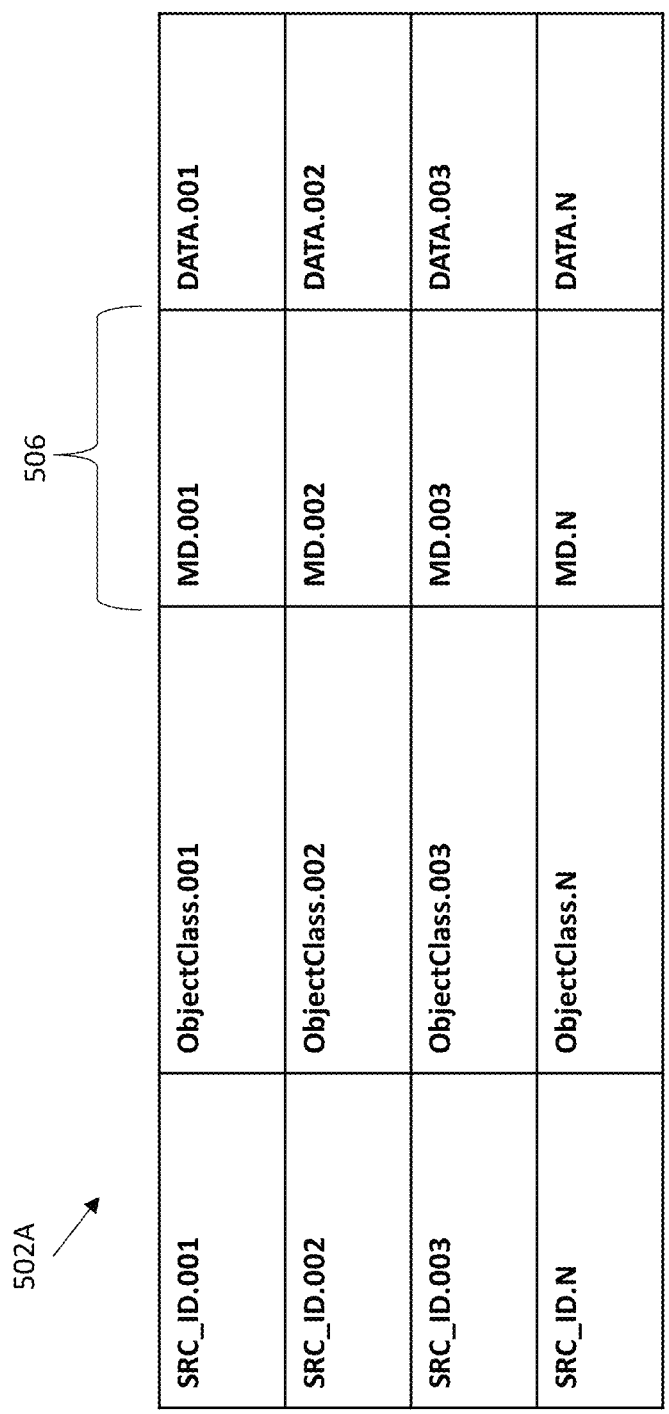
FIG. 5G is a block diagram presenting the first array of FIG. 5C, with a further data field included for metadata.

Referring now generally to the Figures and particularly to FIG. 5G, FIG. 5G is a version of the first array 502 of FIG. 5C further including a metadata field 506 for including metadata MD.001-MD.N to further assist the database-updating operation. The difference between metadata MD.001-MD.N and other data 406 is that metadata MD.001-MD.N is relevant to and might assist the updating process, whereas other data 406 is not relevant to the process except as 'baggage' to be moved around as part of complete records 400. Some non-limiting examples of possible metadata MD.001-MD.N might include: tags for distinguishing and associating groups of records, relevant timestamps, subcategories of object class, structural information regarding object classes, and/or states. What metadata MD.001-MD.N is included or considered relevant, if any, would depend on the database content, updating method in use, and/or user preferences.

Referring now generally to the Figures and particularly to FIGS. 6 through 9, FIGS. 6 through 9 are block diagrams presenting a parent record 600 numbered REC.01, a child record 602 numbered REC.02, and another child record 602 numbered REC.03, each child record having a foreign record identifier 604. These four sets of diagrams walk through step-by-step a preferred method for updating the record identifiers 402 and foreign record identifiers 604 in a parent and child record organization hierarchy. It is understood that parent record 600 and child record 602 are subcategories of record 400. In addition to any or all of the data fields already mentioned as belonging to records 400 in general, child records 602 also include at least one foreign record identifier 604, which is a data field containing the record identifier 402 that identifies a record 400 other than itself, such as the parent record 600 to which this child record 602 pertains. It is noted that, while a record identifier 402 and a foreign record identifier 604 are the same 'data-type', i.e. contain data in the format of 'record identifier', the former identifies the record 400 to which it is attached, and the latter identifies a record 400 that is related to the record 400 to which it is attached. In this example, only the record identifier data fields 402 and 604 are shown: the first column of each record 400 contains the record's own identifier (SourceParentID.01, SourceChildID.02, and SourceChildID.03, respectively), and the middle column of the two child records 602 contains the foreign record identifier 604 of the parent record 600 to which these two child records 602 belong, SourceParentID.01.

Figure 6:
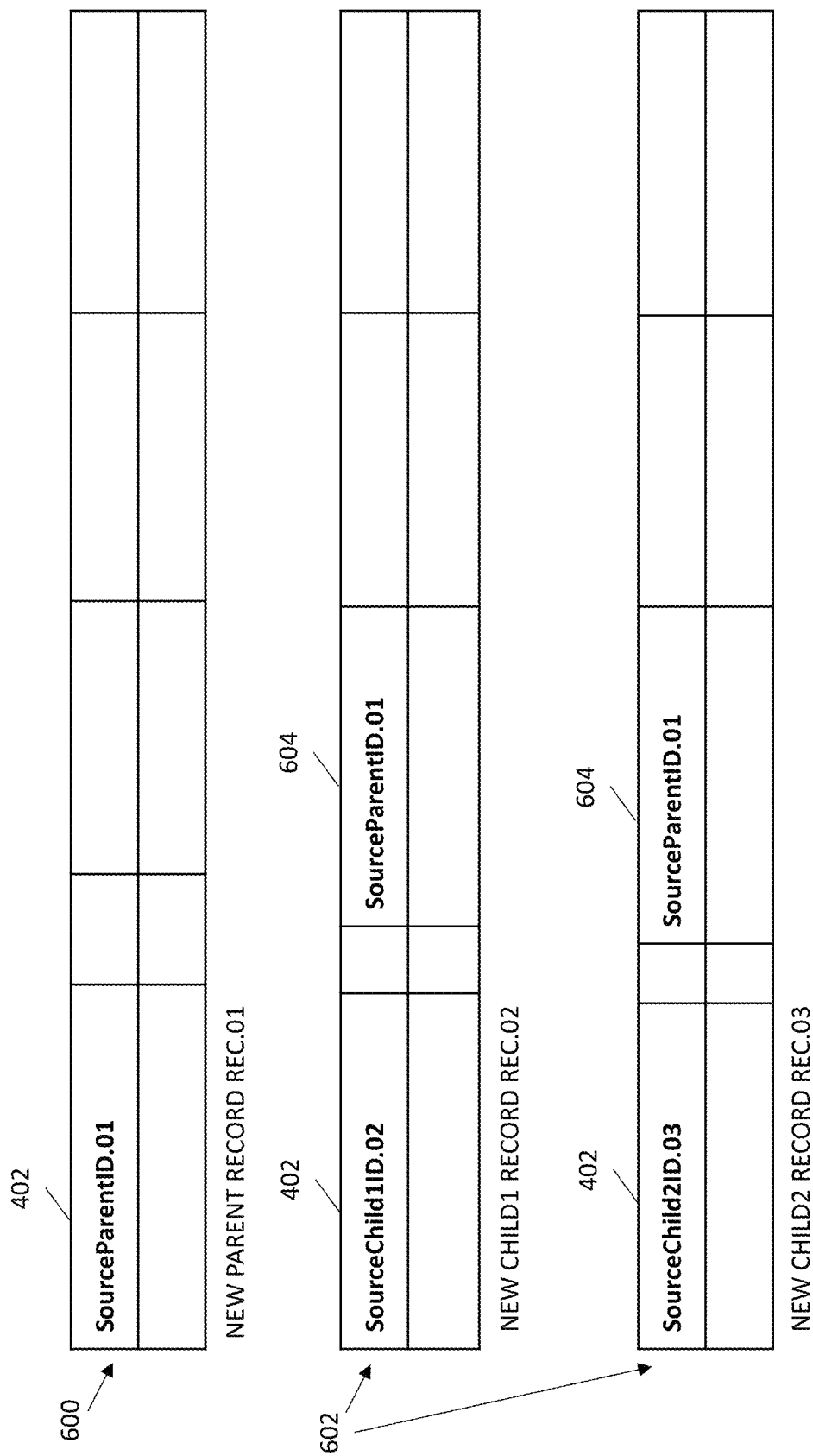
FIG. 6 is a block diagram of a parent record and two child records of the methods of FIGS. 10A through 10C.

In FIG. 6, all three of these first records 400A have been assigned first record identifiers 402A by the first system 102, and those first record identifiers 402A are represented in these block diagrams of FIGS. 6 through 9 as FirstParentID.01 (the first record identifier 402A of REC.01), FirstChildlID.02 (the first record identifier 402A of REC.02), and FirstChild2ID.03 (the first record identifier 402A of REC.03). Further, REC.02 and REC.03 include in each block diagram's middle column the record identifier 402A for their parent, FirstParentID.01—that is, REC.02 and REC.03 are child records 602 linking to REC.01, REC.01 is their linked parent record 600, and the child records include a reference indicator for which parent record 600 they belong to.

In FIG. 7, the record identifier 402 of REC.01 has been upgraded, from a first record identifier 402A to a second record identifier 402B, as indicated by the leftmost column of the block diagram of REC.001 now containing SecondParentID.01 instead. The process of sending REC.01 to the second system 106 and receiving the second record identifier 402B in response is not shown in this Figure; only the result of having done this is presented here, but this process may be found at least at FIGS. 10A through 10C.

In FIG. 8, the foreign record identifiers 604 of the child records 602 have been upgraded next; the child records 602, REC.02 and REC.03, still have first record identifiers 402A as their own record identifiers 402, but their foreign record identifiers 604 indicating their parent relationship have each been upgraded from "FirstParentID.01" to "SecondParentID.01". Again, only the results of an updating process are presented in this Figure, but the updating process producing these results is explicated at least in portions of FIGS. 10A through 10C.

In FIG. 9, the child records 602, REC.02 and REC.03, have each been assigned a second record identifier 402B, SecondChild1ID.02 and SecondChild2ID.03 respectively. The updating process is complete. Since the updating of the parent record links is already complete at this point, this step of the process may be found in FIGS. 10A through 10C, pertaining to simply sending a first record 400A, receiving a second record identifier 402B in response, and updating the first record 400A with the second record identifier 402B.

It should be further noted that 'parent' and 'child' are being used herein as relative terms; a child record 602 is a record 400 that includes at least one foreign record identifier 604, and a parent record 600 is a record 400 that is referenced by at least one foreign record identifier 604 of at least one child record 602. One appreciates that these criteria are not mutually exclusive, and it's possible for the same single record 400 to both include foreign record identifier(s) 604 and also be referenced by foreign record identifiers 604 of other records; therefore, the labels of 'parent' and child' are relative and contextual. A record 400 referred to as a parent record 600 in one context, may itself contain references to (an)other record(s) 400, thus making the same record also a child record 602 as relative to those parent record(s) 600 referenced. Cross-references and inter-linking between records 400 in a database system can get complicated, but this disclosure endeavors to present relatively simple outlining of the concept of first updating the primary record identifiers 402 of the records 400 being referred to (parent records 600), then updating the references (the foreign record identifiers 604 of the child records 602), then updating the primary record identifiers 402 of referents themselves (the child record 602 primary record identifiers 402), a few different ways. This ordinal approach is recommended as tidier and more efficient, though not required or recited as a limitation, at least because the same populated keychange table 500 can be used for updating both the primary record identifiers 402 of the parents and the foreign record identifiers 604 of the children that link to those parents, as these two data fields would contain the same value; one might think of it as a find/replace operation that updates all instances of the 'old' identifier with the 'new' one, including the identifier that identifies the parent record 600 itself, but also anywhere else that same value may appear in the rest of the data, such as in the foreign record identifier 604 data fields of child records 602 that refer to that same parent record 600. Use of metadata might narrow down possible areas in need of update, such as by classifying record object classes as either parent-only, child-only, or both, thus streamlining the process of finding and replacing. This is one strategic reason to update parent records 600 first; another is because the contents of a child record 602 are incomplete without their foreign record identifier(s) 604, and the second database 108 might not necessarily recognize that this data field was relevant and should be updated to match the parent record 600. Loading the child record to the second database 108 only once the child record 602 is complete and only missing its own proper second record identifier 402B, eliminates the difficulty of going back and updating the child record 602 in the second database 108 with the second identifier 402B of its parent record 600 later on, making for a cleaner and simpler updating process all around. By these principles, one might consider 'parent' and 'child' as terminology for strategic updating: a parent record 600 is a record 400 that doesn't use any identifiers 402 other than its own, and may have other records that use its identifier 402 besides itself; and a child record 602 is a record 400 that uses record identifiers 402 other than its own. Further, one might consider a child record 602 with all foreign record identifiers 604 already updated, as functionally equivalent to a parent record 600 for the purposes of updating, as this child record 602 has no foreign record identifiers 604 that aren't 'already taken care of'.

Figure 10A:
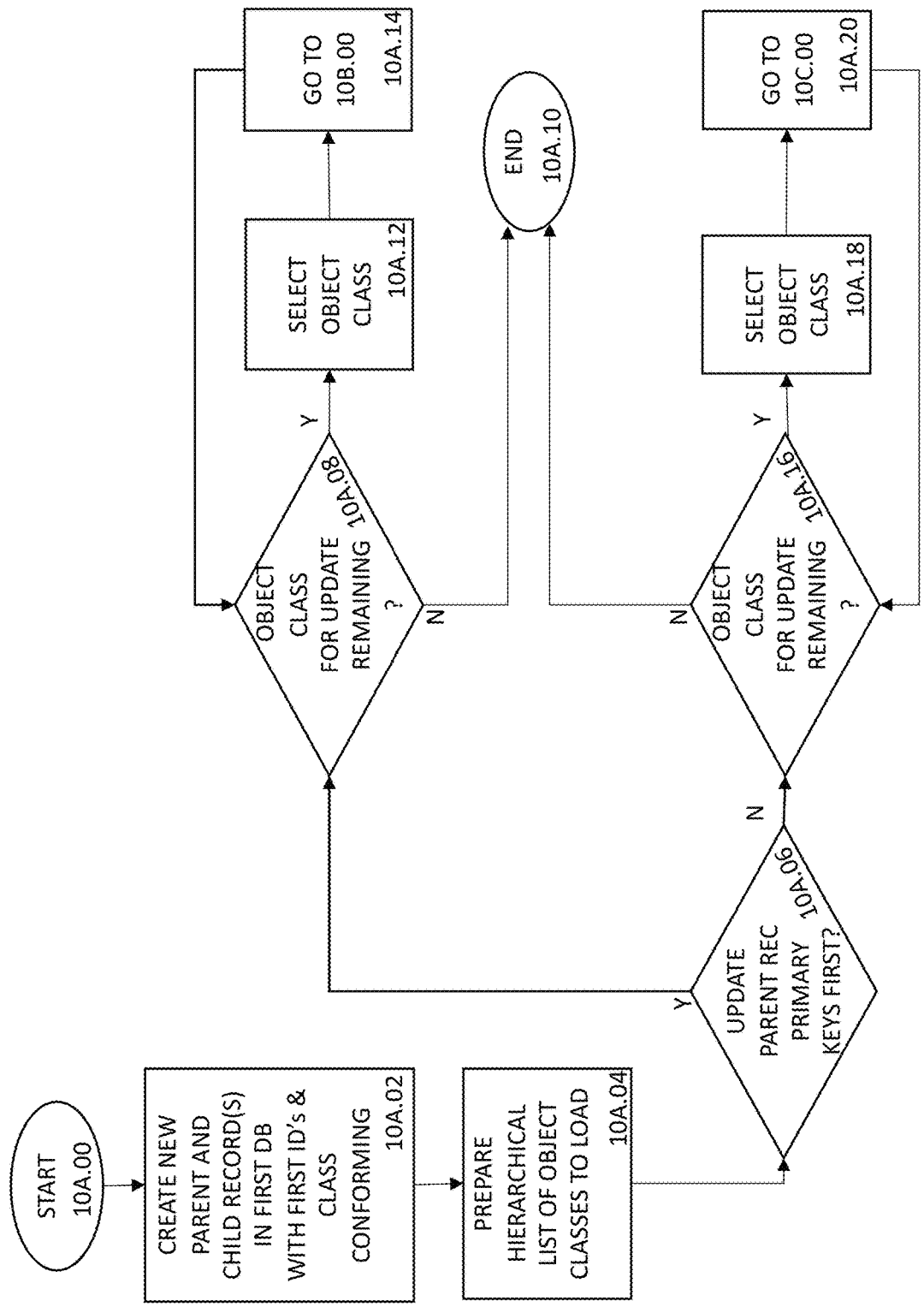
FIG. 10A is a process chart presenting an overview of an additional embodiment of the invented method.
Figure 10B:
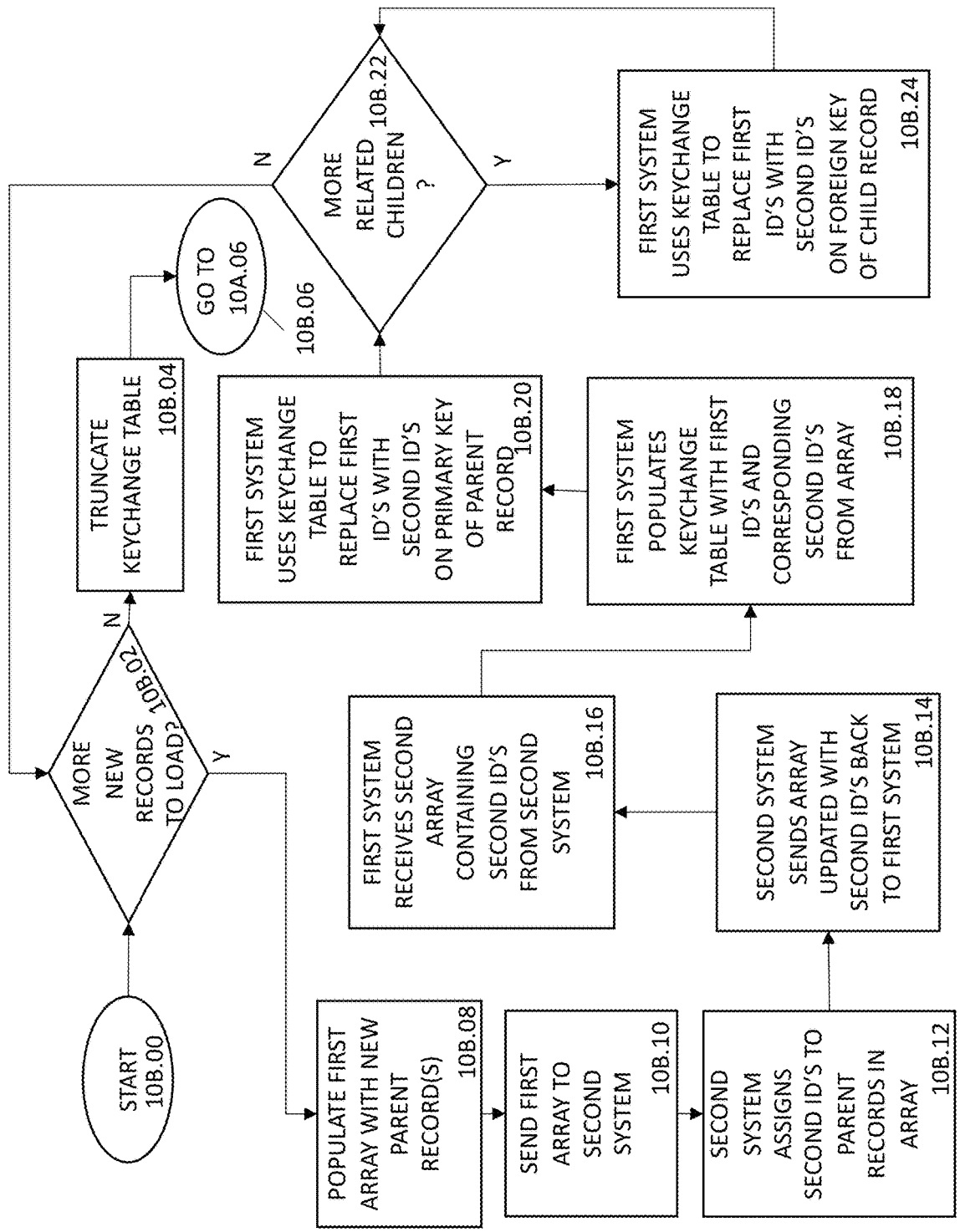
FIG. 10B is a process chart continuing the method of FIG. 10A.
Figure 10C:
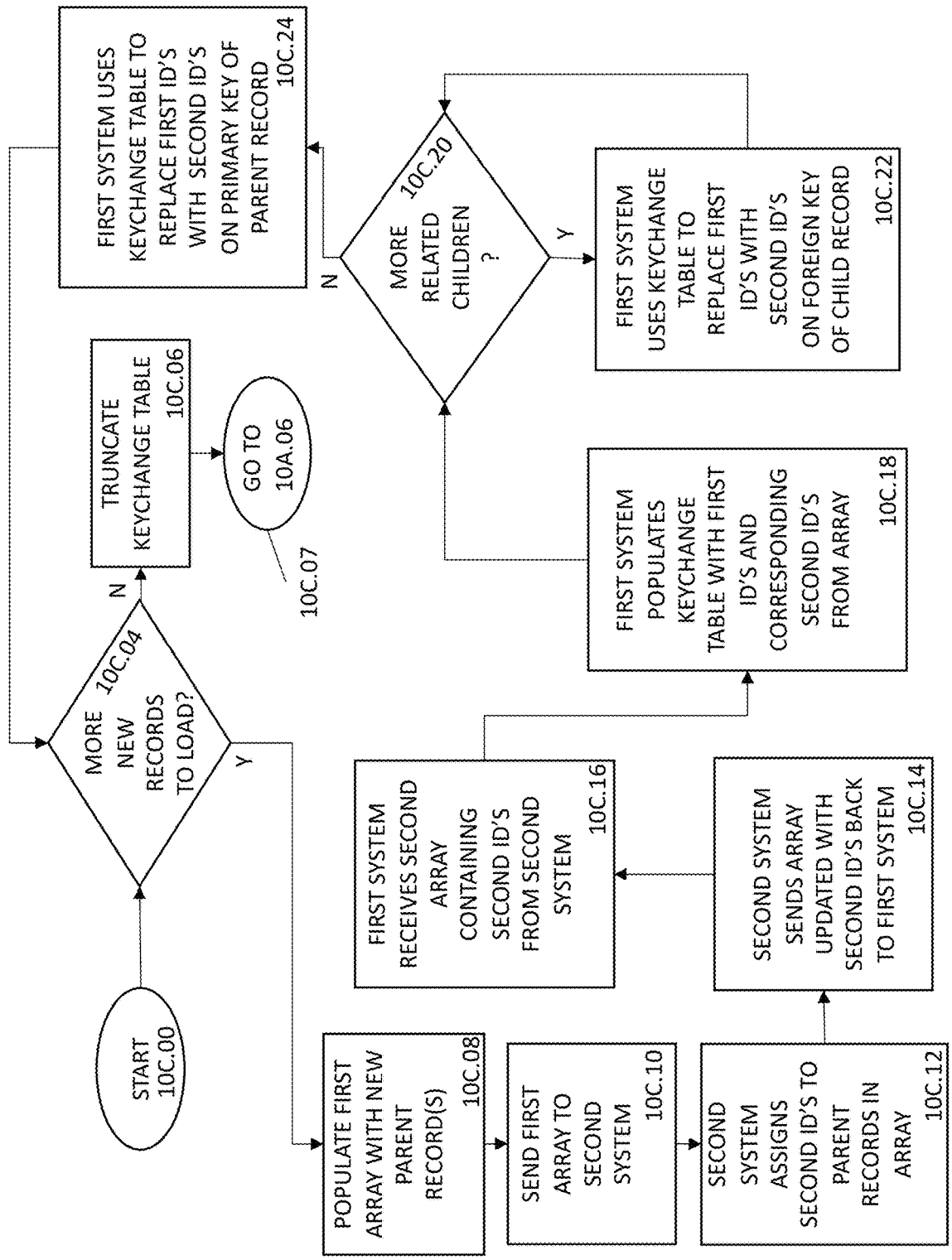
FIG. 10C is a process chart continuing the method of FIG. 10A.

Referring now generally to the Figures and particularly to FIGS. 10A through 10C, FIGS. 10A through 10C are process charts presenting an overview of a preferred embodiment of the invented method.

Beginning with FIG. 10A, the process begins in step 10A.00. In step 10A.02, one or more new parent record(s) 600 are created in the first database 104. This group of one or more new parent records 600 should be considered the 'target group' of the process of this Figure, toward which all of these subsequent updating actions are directed. As these parent records 600 are new, creating them may entail assigning or selecting their object class 404 (i.e. what structure or type of record(s) they are), generating first record identifiers 402A for temporary use in managing these parent record(s) 600, generating appropriate metadata, associating the new parent records 600 with other records such as child records 602 if indicated, providing data entry specific to the new parent record(s) 600, and other actions and processes generally associated with first adding any new record 400 to a database. The first system 102 setting up the new parent record(s) 600 may also set one or more flags that might indicate that these record(s) aren't included in the second database 108 yet, don't have non-temporary second record identifier(s) 402B yet, or otherwise require further work in order to be fully integrated into this network of databases. At the end of step 10A.02, the new parent record(s) 600 may be considered added to the first database, with all data values that are required or preferred for use in implementing the invented method. These parent record(s) 900 may, of course, be modified later on and are not set in stone, but at least basic new record setup for enabling use of the invented method on these parent records 600 is complete. In step 10A.04, a hierarchical list of object classes to load is prepared. This may be considered a listing of sets or groups of new records 400, such that records 400 having the same object class 404 are grouped together as a single item on this list, and these groups are selected one at a time. Grouping records 400 by object class 404 is beneficial at least for the reason that the whole group of records 400 will have the same data structure and also the whole group will either be all parent records 900 or all child records 902, rather than a mixture of data structuring or categorization requiring more analysis during updating. The list is sorted hierarchically, such that classes consisting of parent records 600 are operated upon before classes of child records 602 that require data from the updating of the parent records 600 before the child records 602 can be themselves updated. It may be useful to consider here that 'parent' and 'child' are relative terms; a child record 604 with all foreign reference identifier 602 data fields filled in, is functionally equivalent to a parent record 600. In setting up a list in hierarchical order, the intention is that, by the time it is any given record 400's 'turn' to be loaded to the second system 106 and receive its own second identifier 402B, that record 400 will already be otherwise complete and therefore effectively a parent record 600.

In step 10A.06, it is determined which of two subprocesses will be used to update the new records; that of FIG. 10B, or that of FIG. 10C. The difference is the order in which record data fields are updated once the keychange table 500 has been populated. In the process of FIG. 10B, modification of the record identifiers 402 of the records whose record identifiers 402A & 402B are listed in the keychange table 500 precedes modification of instances of those same keychange table 500 items referenced as foreign record identifiers 604 in child records. In FIG. 10B, the parent records 600 themselves, that is the records listed in the keychange table 500 that just got loaded, are updated prior to their child records 602; in FIG. 10C, these two updates are reversed. In FIG. 10B, these are steps 10B.20 through 10B.24; in FIG. 10C, these are steps 10C.20 through 10C.24. If it was opted to update record identifiers 402 of parent records 600 before foreign record identifiers 604 of child records 602, then step 10A.08 controls a loop; if there are no groups of records still left to update, the process ends at step 10A.10. Otherwise, in step 10A.12, an object class is selected from the hierarchical list of object classes prepared in step 10A.04 to be updated now, and in step 10A.14, the flow continues to step 10B.00 of FIG. 10B, in which the selected object class group of records 400 will be updated. When the process of FIG. 10B is complete for the selected batch of records 400, the flow will return to FIG. 10A at step 10A.06 for the next group. Similarly, if it was opted in step 10A.06 not to update the record identifiers 402 of the parent records 600 prior to the foreign record identifiers 604 of the child records 602, then at step 10A.16, it is checked whether there is at least one object class group of new records 400 that has yet to be processed; if not, the updating process ends at step 10A.10. If there is an object class of records 400 to update, that set of records is selected in step 10A.18, and step 10A.20 directs the flow to FIG. 10C, step 10C.00, for the processing to happen. Similarly, FIG. 10C will return the flow to step 10A.06 of FIG. 10A for the next round, after the process of FIG. 10C is complete for the set of records selected.

Referring now generally to the Figures and particularly to FIG. 10B, FIG. 10B is a subprocess triggered by FIG. 10A, step 10A.14. A target group of new parent records 600 has already been selected by object class grouping, for operating on in FIG. 10B, by the process of FIG. 10A, as disclosed in the text regarding FIG. 10A. The process begins at step 10B.00. Step 10B.02 controls a loop. If there are no more new records to load, in step 10B.04 the keychange table 500 is truncated, and in step 10B.06, the flow returns to FIG. 10A at step 10A.06. If step 10B.02 selects to yes, i.e. there are more new records to load, then the process continues to step 10B.08. for operating on the target group of parent records 600. One reason this loop might repeat multiple times for a single selected target group of records, is in instances where the selected group of records may need to be split into multiple load transactions, such as to accommodate file size of large records or handle huge quantities of records in manageable installments. Splitting a large packet into more manageable 'chunks' is known in the art, and accounted-for here. In step 10B.08, the first array 502 is populated with the selected group of parent records 600. In step 10B.10, the first array 502 is sent over to the second system 106. In step 10B.12, the second system 106 assigns second record identifiers 402B to the parent records 600. In step 10B.14, the second system sends back at least partial copies of the same set of records 600, now with second identifiers 402B, as the second array 504. In step 10B.16, the first system 102 receives the second array 504 sent from the second system 506. In step 10B.18, the first system 102 populates the keychange table 500 with first record identifiers 402A assigned previously by the first system 102 and corresponding second record identifiers 402B received in the second array 504. In step 10B.20, the first system 102 uses the keychange table 500 to update the record identifiers 402 of the group of new parent records 600; strategic use of metadata might easily speed up this process by limiting the set of records to be searched through or making it easy to find the correct data field to be updated regardless of record format. In step 10B.22, if these parent records 600 have any child records 602 that refer to them, a loop commences for updating the foreign record identifiers 604 of these child records 602; use of metadata might assist with quickly ascertaining this. If not, the process returns to step 10B.02, to re-commence the process with another batch of new records if one exists, or end the process otherwise. If there are child records 602 to be updated with foreign record identifiers 604 in step 10B.22, then in step 10B.24, the foreign record identifiers 604 of the child records 602 are updated, such that the child records 602 can refer to their parent records 600 by the second record identifier 402B of the parent record 600. This loop of steps 10B.22 and 10B.24 continues until all of the foreign record identifiers 604 of the child records 602 associated with the target group of parent records 600 are updated. Once all of the parent records 600 within the selected target group, along with all instances of these same records' identifiers 402 used as foreign record identifiers 604, have been updated, the loop controller at step 10B.02 will select to No, the keychange table 500 will be truncated, and the flow will return to FIG. 10A to either select the next batch of records to operate on or end the process once the last batch has been updated.

Referring now generally to the Figures and particularly to FIG. 10C, FIG. 10C is a subprocess triggered by FIG. 10A, step 10A.20. A target group of new parent records 600 has already been selected by object class grouping, for operating on in FIG. 10C, by the process of FIG. 10A, as disclosed in the text regarding FIG. 10A. The process begins at step 10C.00. Step 10C.02 controls a loop. If there are no more new records to load, in step 10C.04 the keychange table 500 is truncated, and in step 10C.06, the flow returns to FIG. 10A at step 10A.06. If step 10C.02 selects to yes, i.e. there are more new records to load, then the process continues to step 10C.08. for operating on the target group of parent records 600. One reason this loop might repeat multiple times for a single selected target group of records, is in instances where the selected group of records may need to be split into multiple load transactions, such as to accommodate file size of large records or handle huge quantities of records in manageable installments. Splitting a large packet into more manageable 'chunks' is known in the art, and accounted-for here. In step 10C.08, the first array 502 is populated with the selected group of parent records 600. In step 10C.10, the first array 502 is sent over to the second system 106. In step 10C.12, the second system 106 assigns second record identifiers 402B to the parent records 600. In step 10C.14, the second system sends back at least partial copies of the same set of records 600, now with second identifiers 402B, as the second array 504. In step 10C.16, the first system 102 receives the second array 504 sent from the second system 506. In step 10C.18, the first system 102 populates the keychange table 500 with first record identifiers 402A assigned previously by the first system 102 and corresponding second record identifiers 402B received in the second array 504. Step 10C.20 controls a loop to continue the child record foreign record identifier 604 updating process as long as there are child records 602 that refer to the parent records 600 of the group being updated; use of metadata might assist with quickly ascertaining this. In step 10C.22, the foreign record identifiers 604 of one or more child records 602 are updated, such that the child records 602 can refer to their parent records 600 by the second record identifier 402B of the parent record 600. Once the child records 602 are updated, in step 10C.24, the first system 102 uses the keychange table 500 to update the record identifiers 402 of the group of new parent records 600; strategic use of metadata might easily speed up this process by limiting the set of records to be searched through or making it easy to find the correct data field to be updated regardless of record format. Once all of the parent records 600 within the selected target group, along with all instances of these same records' identifiers 402 used as foreign record identifiers 604, have been updated, the loop controller at step 10C.02 will select to No, the keychange table 500 will be truncated, and the flow will return to FIG. 10A to either select the next batch of records to operate on or end the process once the last batch has been updated.

While record hierarchies containing more than one level of child records 602 are not included in these examples and Figures, duplicating steps in these process charts to add additional layers of record organization would be fairly straightforward. For one, steps 10A.08 through 10A.20 could be repeated for each level that has another level of records 'below' (referencing) that level, such that the references in the next level down are updated prior to that level receiving its second record identifiers 402B, and the last level to be updated has all of the records' references already filled in by the time the records of that level get their 'turn' as the group of records being sent over. Further, even if one's database does not have records 400 grouped neatly into 'generations' of parent and child groups, as these process charts may seem to suggest, that would merely indicate different approaches to grouping of records, such as smaller or less homogenous groups. It is observed and understood that every database is different, and this disclosure offers only generally advised approaches for guiding any particular implementation of the invented method.

Additionally, it should be noted that this 'one tier at a time' method of updating a database containing a record hierarchy is far from being the only way to accomplish the same task, and is reflective primarily of a concern that the first system 102 is doing most of the work, such as managing that foreign record identifiers 604 are updated, and the second system 106 need only supply the second record identifiers 402B. This is important and relevant in a situation wherein the transaction is one-sided and the second database 108 is a software service, such as Salesforce, rather than a remote database over which a user has more direct control, such as a 'headquarters' database within the same company or enterprise. The second system 106 may not recognize a database hierarchy that is being implemented by the first system 102, but the second system 106 doesn't necessarily have to recognize the significance of everything the first system 102 includes in the records, as long as appropriate maintenance of these details is managed by the first system 102, and all the second system 106 need do is store records and dispense identifiers.

Figure 11:
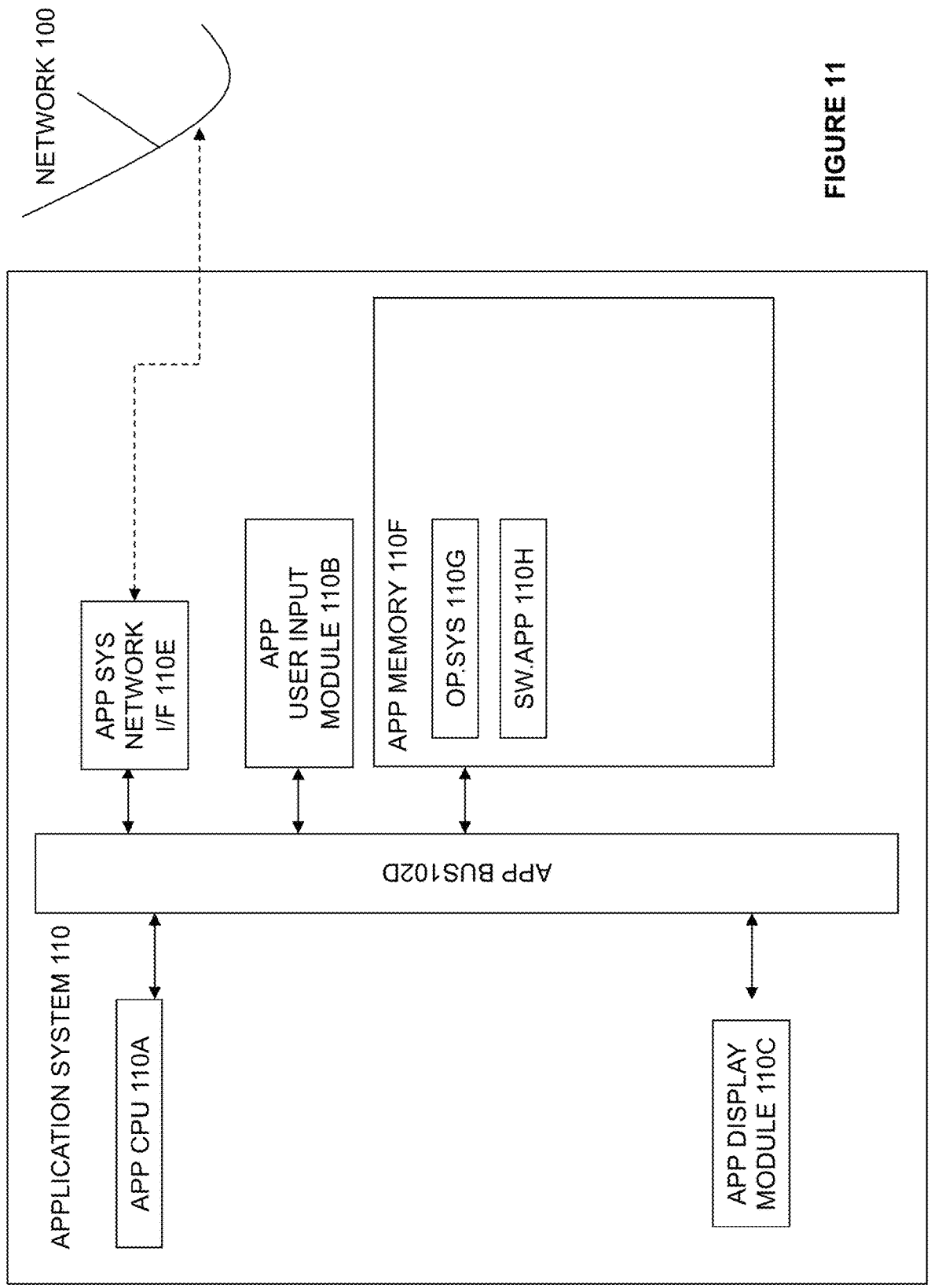
FIG. 11 is a block diagram of the optional application system of FIG. 1.

Referring now generally to the Figures, and particularly to FIG. 11, FIG. 11 is a block diagram of the application system 110 of the network 100 of FIG. 1 and displaying together both hardware and software aspects thereof, wherein the application system 110 comprises: a central processing unit ("CPU") 110A; a user input module 102B; a display module 110C; a software bus 110D bi-directionally communicatively coupled with the CPU 110A, the user input module 110B, and the display module 110C; the software bus 110D is further bi-directionally coupled with a network interface 110E, enabling communication with alternate computing devices by means of the network 100; and an application memory 110F. The application software bus 110D facilitates communications between the above-mentioned components of the application system 110.

Alternatively, optionally and/or additionally, the application system 110 and its functions as disclosed in the present disclosure are wholly or in part are comprised within, provided within, and/or made accessible via, or directly or indirectly via the network 100, including but not limited to a Virtual Machine and/or Platform as a Service, including but not limited to an Amazon Web Services (AWS) asset, a Microsoft Cloud (Azure) asset or service, a Google Cloud service or asset, and Oracle Cloud Infrastructure (OCI) asset or service, and/or one or more suitable internet-accessible assets or services in singularity, in concert or in combination.

The memory 110F of the application system 110 includes an application software operating system OP.SYS 110G. The application software OP.SYS 110G of the application system 110 may be selected from freely available, open source and/or commercially available operating system software, to include but not limited to a.) an HP Z620 AutoCAD Workstation E5-1620v2™ marketed by Hewlett Packard Enterprise of San Jose, Calif. and running a WINDOWS 10 PROFESSIONAL™ 64-Bit operating system as marketed by Microsoft Corporation of Redmond, Wash.; (b.) a Dell Precision Mobile Workstation 3551—15.6"—Core i5 10300H™ marketed by Dell Corporation of Round Rock, Tex.; (c.) a MAC PRO™ workstation as marketed by Apple, Inc. of Cupertino, Calif.; or (d.) other suitable computational system or electronic communications device known in the art capable of providing networking and operating system services as known in the art capable of providing networking and operating system services as known in the art. The exemplary application system software program SW.SRC 102H consisting of executable instructions and associated data structures is optionally adapted to enable the application system 110 to (a.) generate messages and communicate with the first system 102 and the second system 106, (b.) process messages received from the first system 102 and the second system 106, and (c.) direct and enable the first system 102 and the second system 106 to perform the invented method upon their respective databases.

Figure 12:
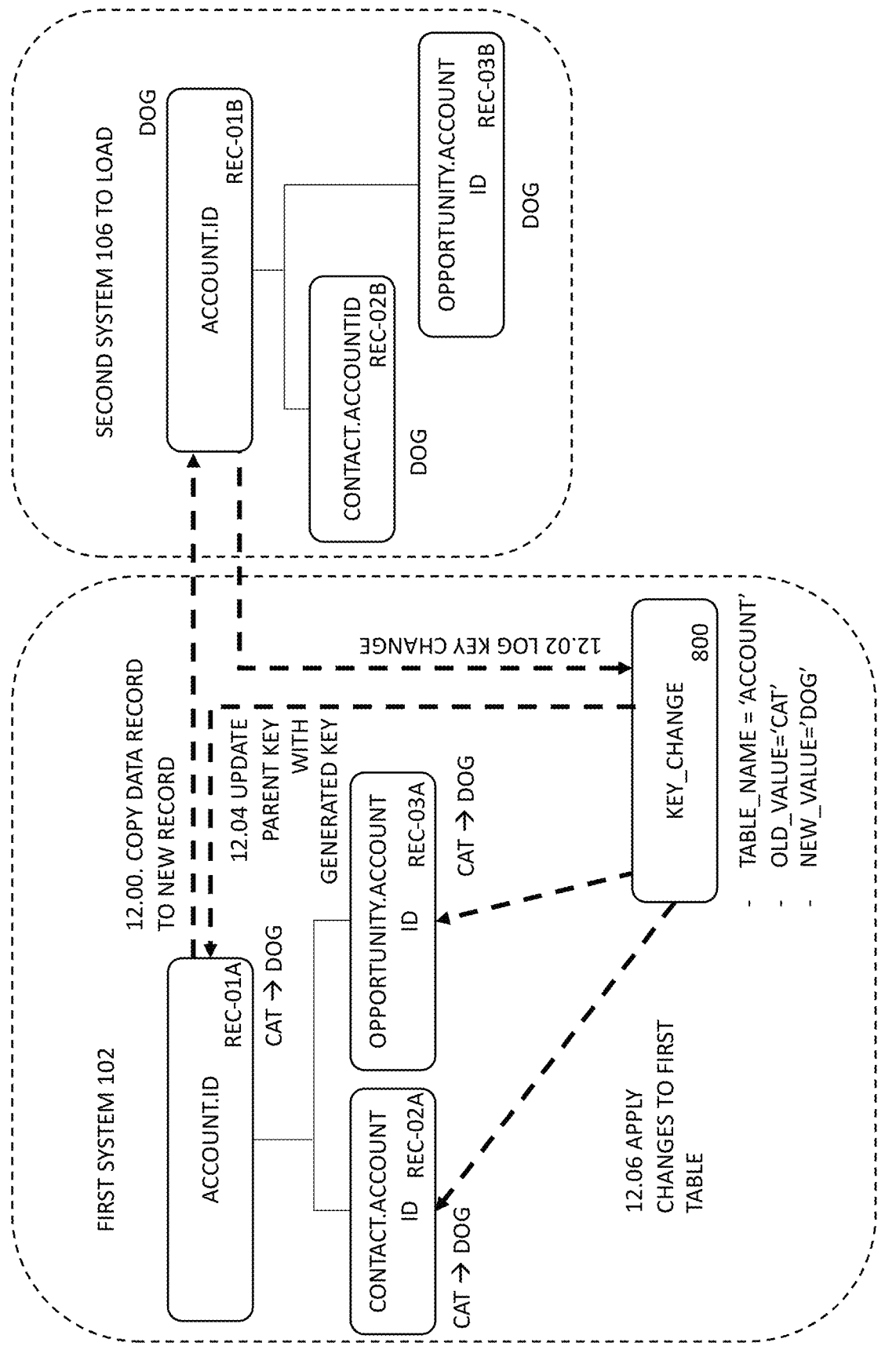
FIG. 12 is a diagram that may further assist in explicating the invented method of FIGS. 10A through 10C.
Figure 13:
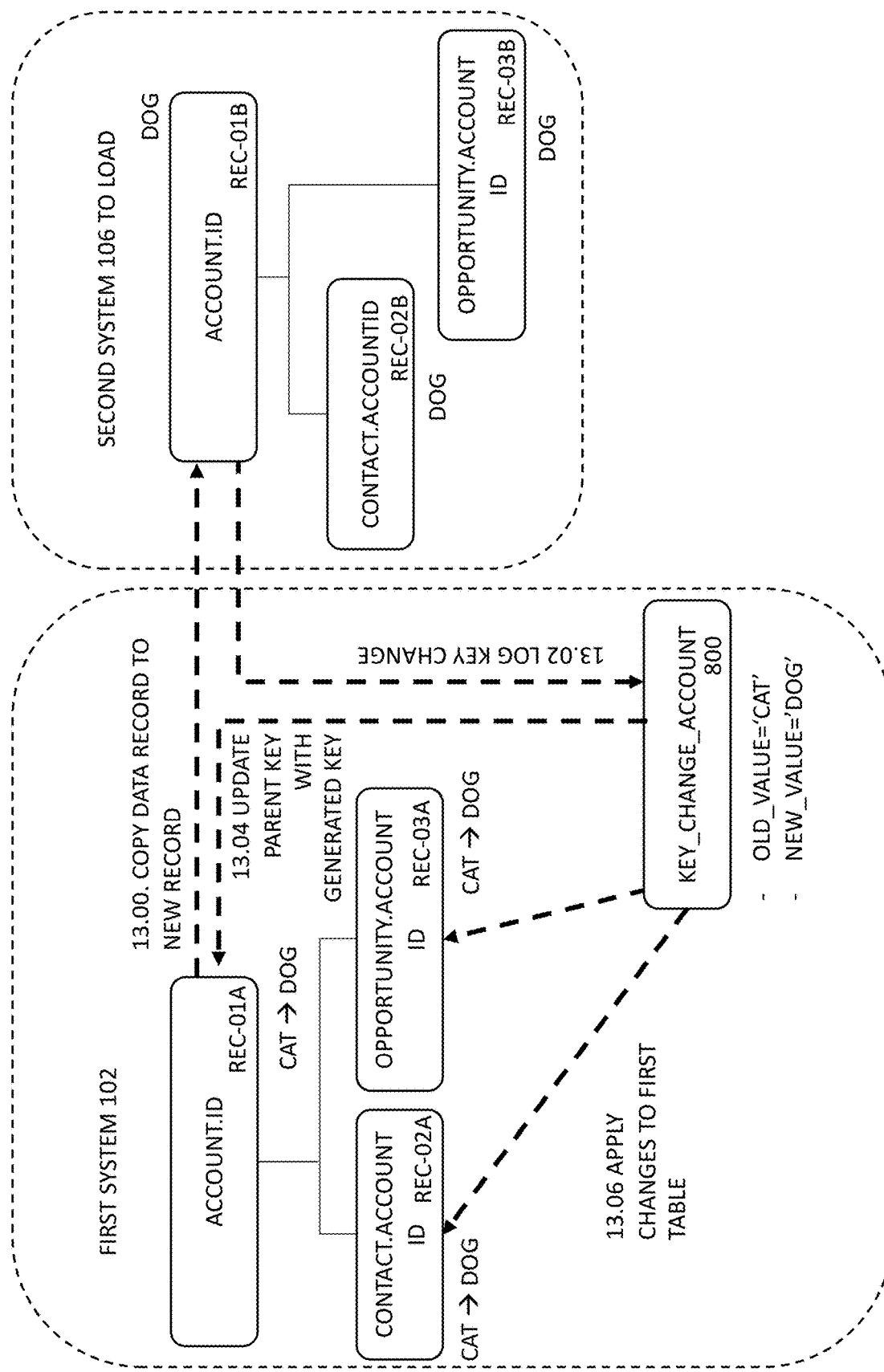
FIG. 13 is a diagram similar to the diagram of FIG. 12 that may further assist in explicating the invented method of FIGS. 10A through 10C.

Referring now generally to the Figures and particularly to FIGS. 12 and 13, FIGS. 12 and 13 are process charts that may further assist in explicating the invented method. The charts of FIGS. 12 and 13 contain both processes and objects. The processes are numbered as steps 13.00 through 13.06. The objects are numbered as already presented in previous Figures, with the exception of the record numbering scheme, which is first introduced in this Figure but similar to FIGS. 6 through 9; hyphens are used instead of periods to prevent any confusion with the process steps. The process steps are depicted as dashed lines with arrows, while the data structures are interconnected using thinner, non-dashed lines. Further, the values "CAT" and "DOG" are placeholders indicating instances of the first record identifier 402A ("CAT") and the second record identifier 402B ("DOG"), such that in the first system the initial value is CAT and the value is later updated to DOG, the values in the second system remain DOG the entire time, and the keychange table 500 keeps track of the information that the 'old value' is CAT and the corresponding 'new' value to replace CAT with is DOG. In the embodiment of FIG. 12, the keychange table 500 also keeps track of the name of the table to which this information pertains, "ACCOUNT", whereas in FIG. 13 this is built-in another way, such as this being the only database being operated upon, or otherwise being functionally tied to this database specifically such that no label is required for this.

In step 12.00, a first record REC-01A, an instance of the first record 400A as explicated in FIG. 4, is loaded or copied to the second system 106 to instantiate a new second record 400B, labeled herein as REC-01B. In step 12.02, the second record identifier 402B ("DOG") as assigned by the second system 106 is logged accordingly in the keychange table 500. In step 12.04, the first database record 400A is updated with the newly received second record identifier 402B ("DOG"), and the value updated from "CAT" to "DOG". Further, in step 12.06, this identifier update ("CAT" to "DOG") is also applied to the child records REC-02A and REC-03A of the first record 400A. When these records are then loaded to the second system, the new child records REC-02B and REC-03B already have the DOG identifier for their parent record REC-01A.

Regarding FIG. 13, in step 13.00, a first record REC-01A, an instance of the first record 400A as explicated in FIG. 4, is loaded or copied to the second system 106 to instantiate a new second record 400B, labeled herein as REC-01B. In step 13.02, the second record identifier 402B ("DOG") as assigned by the second system 106 is logged accordingly in the keychange table 500. In step 13.04, the first database record 400A is updated with the newly received second record identifier 402B ("DOG"), and the value updated from "CAT" to "DOG". Further, in step 13.06, this identifier update ("CAT" to "DOG") is also applied to the child records REC-02A and REC-03A of the first record 400A. When these records are then loaded to the second system, the new child records REC-02B and REC-03B already have the DOG identifier for their parent record REC-01A.

The following is pseudocode for aspects of the invented method that may be comprised within one or more other additional alternate preferred embodiment of the invented method, with step numbers included from FIGS. 10A through 10C where they correspond or are related:

Starting from the highest point in the relational hierarchy,
Step 10B.10 and step 10C.10—send the records from database one with their temporary key values to database two,
Step 10B.12 and step 10C.12—second system generates its own permanent primary key,
Step 10B.14 and step 10C.14—second system returns an ordered list of generated keys
Step 10B.16 and step 10C.16—receive the key values generated by database two,
Step 10B.18 and step 10C.18—pair the new keys with the old keys by their position in the arrays, and save the old keys with their new keys in the keyChangeTable,
Step 10B.20-24 and step 10C.20-24—update the primary keys for the current parent table and all the child/foreign key tables.

Regarding step 10B.20 and step 10C.24, the following is SQL pseudocode for updating the current parent table if there is a matching record in the keyChangeTable:

```
update      parentTable
set         primaryKeyColumn =
    (select newValue
    from        keyChangeTable
    where       oldValue = parentTable. primaryKeyColumn)
where exists
    (select 1
    from        keyChangeTable
    where       oldValue = parentTable.primaryKeyColumn)
```

Regarding step 10B.22 and step 10C.22, the following is SQL pseudocode for using the names of the parent table and its primary key, and all the child tables and their foreign keys (a.k.a. imported keys) from the DatabaseMetaData using the getImportedKeys JDBC metadata call:

getImportedKeys(primaryKeyTable, primaryKeyColumn)
RETURNS A LIST OF
foreignKeyTable, foreignKeyColumn
for each row returned
LOOP
fetch
   foreignKeyTable,
   foreignKeyColumn Regarding step 10B.24 and/or step 10C.24, to update each child/foreign key table if there is a matching record in the keyChangeTable:

```
Update      foreignKeyTable
set         foreignKeyColumn =
  (select newValue
   from     keyChangeTable
   where    oldValue = foreignKeyTable.foreignKeyColumn)
where exists
  (select 1
   from     keyChangeTable
   where    oldValue = foreignKeyTable.foreignKeyColumn)
END LOOP
```

Regarding step 10B.06 and step 10C.06, upon successful completion of loading all of the current parent table's records and updating all the primary and foreign key values:
   truncate keyChangeTable It is understood that the first system 102 truncates the keyChangeTable at the end of the process. If the process crashes mid-way, the first system 102 will still have the key changes left to process on those instances where the first system 102 resumes loading the parent table.

The first system alternatively can make the keyChangeTable safe for restartability where more than one table is being loaded in parallel by
   using a separate keyChangeTable for every real table in the schema with a unique key of oldvalue, or
   using one keyChangeTable with the name of the parent table as part of the unique key (tableName, oldValue) and deleting rows using the tableName as a search instead of truncating the entire table.

The first method is preferred for restartability, as there is less likelihood of losing the contents of the key changes until the first system 102 is completed with all processing, and truncating is more efficient than deleting records.

It is understood that optimization of the basic invented method as described herein is entirely possible and obvious, such that the same method may be practiced more efficiently by a computer or produce more optimal results. While novel approaches to optimization of any software process might be inventions in and of themselves, it is understood that an optimized version of this invented method remains an embodiment or instance of this same invented method, and further obvious innovation and improvement in successfully and optimally practicing this method should still be considered to be embodiments of this same invention.

While selected embodiments have been chosen to illustrate the invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A computer implemented method for management of key changes in relational references in an information technology system comprising a source database and a target database, the method comprising:
   a. Maintaining a plurality of source records in the source database, each record associating with a unique identifier;
   b. Generating a new source record within the source database;
   c. Associating a temporary unique identifier with the new source record, wherein the temporary unique identifier is applied as a unique identifier key of the new source record and distinguishes the new source record from the plurality of source records;
   d. Creating a new record in the target database as a copy of the source database record;
   e. Receiving a new target-assigned unique identifier, the new target-assigned unique identifier distinguishing the new source record from the plurality of source records and the temporary unique identifier;
   f. Writing the new target-assigned unique identifier and the temporary unique identifier into a key table as an associated key pair; and
   g. Revising the source database to associate the new target-assigned unique identifier as a persistent unique identifier of the new source record.

2. The method of claim 1, wherein the temporary unique identifier is comprised within the new source record.

3. The method of claim 2, wherein the target-assigned unique identifier is written into the new source record.

4. The method of claim 3, wherein the temporary unique identifier is updated in the new source record.

5. The method of claim 1, further comprising deleting the associated key pair from the key table after revising the source database to associate the new target-assigned unique identifier as a persistent unique identifier of the new source record.

6. The method of claim 1 further comprising:
   h. Denoting the temporary unique identifier within the source database to associate at least one child record of the source database with the new source record using a relationship field; and
   i. After receipt of the target-assigned unique identifier, revising the source database to apply the target-assigned unique identifier's value to at least one relationship field in at least one child record of the source database in order to persistently re-associate the child record with the new source parent record.

7. The method of claim 1 further comprising maintaining in the target database a target copy record of at least one child record of the source database.

8. The method of claim 7 further comprising:
j. Revising the source database to apply the target-assigned unique identifier of the newly created target child record to the unique identifier child record of the source database.

9. The method of claim 1 further comprising:
h. Denoting the temporary unique identifier within the source database to associate a first plurality of child records of the source database with the new source record;
i. After receipt of the target-assigned unique identifier, revising the source database to apply the target-assigned unique identifier to associate the first priority of child records of the source database with the new source record using the child record relationship fields.

10. The method of claim 9, further comprising deleting the associated key pair from the key table after revising the source database to associate the new target-assigned unique identifier as a persistent unique identifier of the new source record.

11. A computer implemented method for management of key changes in relational references in an information technology network comprising a source system hosting a source database and a target system hosting a target database, the method comprising:
a. Maintaining a plurality of source records in the source database, each record associating with a unique identifier;
b. Generating a new source record within the source system:
c. Associating a temporary unique identifier with the new source record within the source system, wherein the temporary unique identifier is applied as a unique identifier key of the new source record and distinguishes the new source record from the plurality of source records;
d. Creating a new record in the target database of the target system as a copy of the source database record;
e. Receiving a new target-assigned unique identifier, the new target-assigned unique identifier distinguishing the new source record from the plurality of source records and the temporary unique identifier;
f. Writing the new target-assigned unique identifier and the temporary unique identifier into a key table as an associated key pair; and
g. Revising the source database to associate the new target-assigned unique identifier as a persistent unique identifier of the new source record.

12. The method of claim 11 further comprising:
h. Denoting the temporary unique identifier within the source database to associate a first plurality of child records of the source database with the new source record; and
i. After receipt of the target-assigned unique identifier, revising the source database to apply the target-assigned unique identifier to associate the first priority of child records of the source database with the new source record.

13. The method of claim 12, further comprising disabling the application of the temporary unique identifier within the source database to associate the first plurality of child records of the source database with the new source record.

14. The method of claim 11, further comprising deleting the associated key pair from the key table after revising the source database to associate the new target-assigned unique identifier as a persistent unique identifier of the new source record.

15. The method of claim 11, wherein the new target-assigned unique identifier is established by the target system.

16. An information technology system comprising at least one computer having a processer coupled with a memory and adapted to enable a database management software, a source database and a target database, and the memory enabled to access and apply instructions that operatively direct the information technology system to:
a. Maintain a plurality of source records in the source database, each record associating with a unique identifier;
b. Generate a new source record within the source database;
c. Associate a temporary unique identifier with the new source record, wherein the temporary unique identifier is applied as a unique identifier key of the new source record and distinguishes the new source record from the plurality of source records;
d. Create a new record in the target database as a copy of the source database record;
e. Receive by the source database a new target-assigned unique identifier, the new target-assigned unique identifier distinguishing the new source record from the plurality of source records and the temporary unique identifier;
f. Write the new target-assigned unique identifier and the temporary unique identifier into a key table as an associated key pair; and
g. Revise the source database to associate the new target-assigned unique identifier as a persistent unique identifier of the new source record.

* * * * *